US009329806B2

(12) United States Patent
Ishigure

(10) Patent No.: US 9,329,806 B2
(45) Date of Patent: May 3, 2016

(54) IMAGE PRODUCING DEVICE, IMAGE FORMING DEVICE, AND IMAGE PROCESSING DEVICE

(75) Inventor: Tsuyoshi Ishigure, Tokyo (JP)

(73) Assignee: Oki Data Corporation, Tokyo (JP)

( * ) Notice: Subject to any disclaimer, the term of this patent is extended or adjusted under 35 U.S.C. 154(b) by 928 days.

(21) Appl. No.: 12/731,498

(22) Filed: Mar. 25, 2010

(65) Prior Publication Data

US 2010/0245915 A1  Sep. 30, 2010

(30) Foreign Application Priority Data

Mar. 30, 2009  (JP) ................................. 2009-081235

(51) Int. Cl.
| | |
|---|---|
| G06K 15/00 | (2006.01) |
| G06F 3/12 | (2006.01) |
| H04N 1/00 | (2006.01) |
| H04N 1/32 | (2006.01) |
| H04N 1/44 | (2006.01) |

(52) U.S. Cl.
CPC .............. *G06F 3/1203* (2013.01); *G06F 3/128* (2013.01); *G06F 3/1237* (2013.01); *H04N 1/0044* (2013.01); *H04N 1/00347* (2013.01); *H04N 1/00474* (2013.01); *H04N 1/00482* (2013.01); *H04N 1/32122* (2013.01); *H04N 1/4413* (2013.01); *H04N 2201/0015* (2013.01); *H04N 2201/0087* (2013.01); *H04N 2201/0094* (2013.01); *H04N 2201/3221* (2013.01); *H04N 2201/3226* (2013.01); *H04N 2201/3273* (2013.01)

(58) Field of Classification Search
None
See application file for complete search history.

(56) References Cited

U.S. PATENT DOCUMENTS

| 7,945,588 B2* | 5/2011 | Sawayanagi et al. ......... 707/795 |
| 2005/0050111 A1* | 3/2005 | Sensnovis ..................... 707/203 |
| 2005/0160068 A1* | 7/2005 | Sakaguchi ........................ 707/1 |
| 2007/0033540 A1* | 2/2007 | Bridges et al. ............... 715/769 |
| 2010/0110465 A1* | 5/2010 | Ferlitsch et al. ............ 358/1.13 |

FOREIGN PATENT DOCUMENTS

| JP | 2006004137 A | * | 1/2006 |
| JP | A-2006-341497 | | 12/2006 |
| JP | A-2007-329661 | | 12/2007 |

* cited by examiner

*Primary Examiner* — Marivelisse Santiago Cordero
*Assistant Examiner* — Neil R McLean
(74) *Attorney, Agent, or Firm* — Muncy, Geissler & Olds & Lowe, P.C.

(57) ABSTRACT

An image producing device by which image data that is produced by an image producing unit is written in an external memory medium, or by which image data is read from the external memory medium and written to a device main unit of the image producing device, the device main unit includes: a record unit configured to record first identification information of image data that is written in the external memory medium; a data storage unit configured to store image data that is recorded by the record unit; and a data operation unit configured to move image data from the external memory medium to the data storage unit based on the first identification information in the record unit.

15 Claims, 17 Drawing Sheets

| No. | USER ID | FILE NAME | STORAGE LOCATION |
|---|---|---|---|
| 1 | 0000 | SCAN_0000 | MEMORY CARD |
| 2 | 0000 | PRINT_0000 | MEMORY CARD |
| 3 | 0001 | PRINT_0001 | TEMPORARY STORAGE |
| 4 | 0001 | SCAN_0001 | TEMPORARY STORAGE |

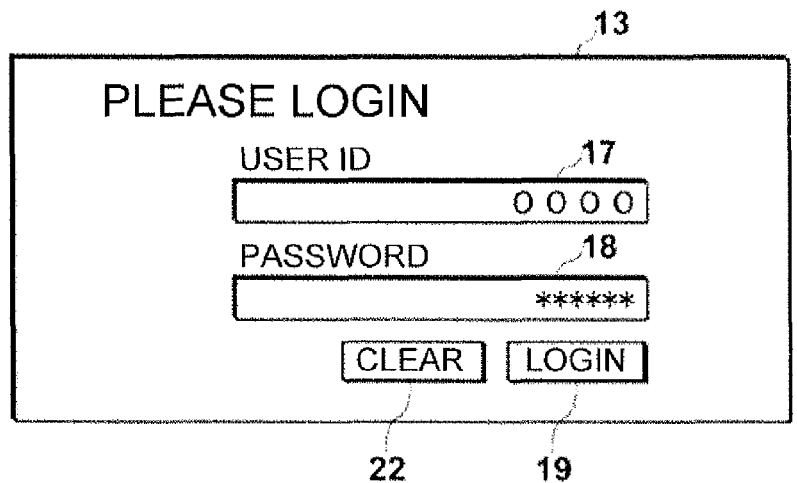
Fig. 5
| USER ID | PASSWORD | EMAIL ADDRESS |
|---|---|---|
| 0000 | 0123456 | aaa@ddd.com |
| 0001 | 9876543 | ccc@ddd.com |
Fig. 6
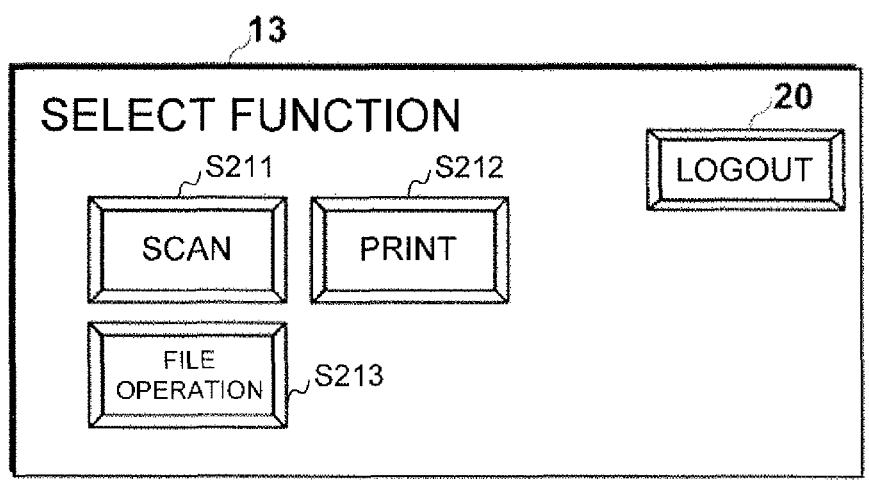
Fig. 7

IMAGE PRODUCING DEVICE, IMAGE FORMING DEVICE, AND IMAGE PROCESSING DEVICE

CROSS REFERENCE

The present application is related to, claims priority from and incorporates by reference Japanese patent application number 2009-081235, filed on Mar. 30, 2009.

TECHNICAL FIELD

The present application relates to an image producing device, an image forming device, and an image processing device that function to produce, process, form, or memorize image data, such as a printer, a photocopy machine, a scanner, or the like.

BACKGROUND

A multi function peripheral (MFP) or the like is generally well known as a device that has the functions discussed above.

The MFP is a multifunction machine that has both an image-forming function as a printer, and an image-producing function and an image-processing function as a scanner and a photocopy machine. A latest MFP has further range of functions; for example, printing a photo image by connecting a digital camera to a device main unit; printing by importing image data from an external memory medium through a USB connector while directly connecting to the external memory medium; and in contrast, recording to an external memory medium.

For example, there exists technology that prints image data, such as a photo, that is read from a digital camera, such as a device that is shown in Japanese laid-open patent application number 2007-329661 (patent reference 1).

There also exists a technology that prints image data read from an external memory medium, such as a memory card, such as a device that is shown in Japanese laid-open patent application number 2006-341497 (patent reference 2).

The device disclosed in patent reference 2 relates to a technology of an MFP. After image data, such as a photo, that is stored in an external memory medium is imported with encryption to a memory means in a device main unit. The device then prints required image data and so on by operating a printer. When a certain period of time has passed without removing the external memory medium from the device main unit after the printing operation, all data in the external memory medium is saved in the memory means. Because data in the external memory medium is erased, this provides an antitheft measure for data in the external memory medium.

However, due to security reasons, all data in the external memory medium, including unused data, is moved to a data storage unit in the device main unit in the conventional MFP. Therefore, when data that is moved to the device main unit is returned to the original external memory medium, problems can occur in that complex operations and time are required.

An object of the following disclosure is to provide an image producing device, an image forming device, and an image processing device in which image data in an external memory medium can be selectively moved to the data storage unit in the device main unit under an identifiable condition so that complex operations and time for restoring the image data to the external memory medium can be omitted, thereby improving user-friendliness.

SUMMARY

The disclosure provides the following basic structures to achieve the object discussed above. An image producing device by which image data that is produced by an image producing unit is written in an external memory medium, or by which image data is read from the external memory medium and written to a device main unit of the image producing device, the device main unit includes: a record unit configured to record first identification information of image data that is written in the external memory medium; a data storage unit configured to store image data that is recorded by the record unit; and a data operation unit configured to move image data from the external memory medium to the data storage unit based on the first identification information in the record unit.

In another aspect of the present application, an image forming device in which image can be formed based on image data recorded in an external memory medium or formed by an image data scanning means in a device main unit, in the device main unit includes: a record unit configured to record first identification information of image data that is written in the external memory medium; a data storage unit configured to store image data that is recorded by the record unit; and a data operation unit configured to move image data from the external memory medium to the data storage unit based on the first identification information recorded in the record unit.

In another aspect of the present invention, an image processing device having a device main unit, by which image data is recorded, recorded image data is read, and image data is written in an external memory medium, the device main unit comprising: a record unit configured to record first identification information of image data that is written in the external memory medium; a data storage unit configured to store image data that is recorded by the record unit; and a data operation unit configured to move image data in the external memory medium to the data storage unit based on the first identification information recorded in the record unit.

Because the present application had the structures discussed above, required image data is selectively moved from the external memory medium to the data storage unit in the device main unit under an identifiable condition. When the image data is used for image producing, the required image data can be selected based on record information from an identification information record unit. Because unused image data is not moved from the external memory medium, complex operations and time for restoring the image data to the external memory medium can be omitted, thereby improving user-friendliness. When a user logs out while the external memory medium is attached, data in the external memory medium is moved to the data storage unit at the time of a next user's logging in. Therefore, the third party cannot use the data in the external memory medium. Security is also improved.

BRIEF DESCRIPTION OF THE DRAWINGS

FIG. 5 is an image view showing display contents of an operation panel according to the first disclosed embodiment.

FIG. 6 is a diagram showing user information according to the first disclosed embodiment.

FIG. 7 is an image view showing display contents of an operation panel according to the first disclosed embodiment.

DETAILED DESCRIPTION

An embodiment of the present application is explained based on drawings.

First Disclosed Embodiment

Figure 1:
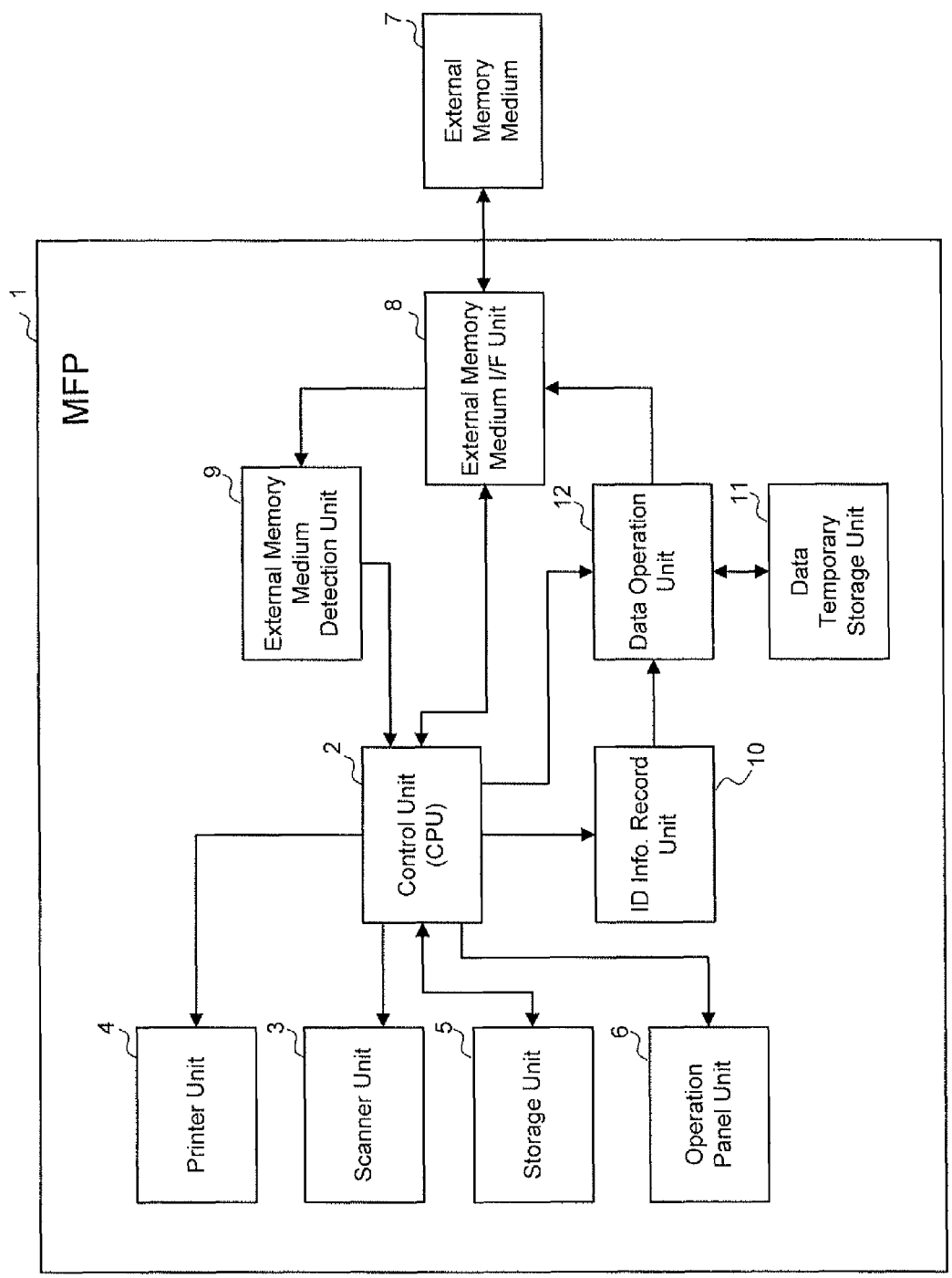
FIG. 1 is a block diagram of a basic structure of an MFP according to a first disclosed embodiment of the present application.

FIG. 1 is a block diagram of a basic structure of an MFP as an image producing device, an image forming device, and an image processing device according to a first disclosed embodiment of the present application.

As shown in FIG. 1, an MFP has a control unit 2 (hereinafter referred to as a CPU), a scanner unit 3 that connects the CPU 2 through a control bus or the like and that produces an image, a printer unit 4 that forms an image, a storage unit 5 that stores an image, and an operation panel unit 6.

An external memory medium interface (I/F) unit 8 for an external memory medium (memory card, memory disk or the like) 7, an external memory medium detection unit 9, an identification information record unit 10, a data temporary storage unit 11, and a data operation unit 12 are also connected to the CPU 2 of the MFP 1.

The CPU 2 is configured with a control circuit (not shown), an arithmetic logical unit (ALU), a register, and so on. The CPU 2 performs control operations, such as: selectively reading image data from the external memory medium 7, processing the data, and outputting it; performing a detachable determination of the external memory medium 7; and further controlling overall operation of the MFP 1 based on various programs that are stored in the storage unit 5.

The external memory medium 7 stores image data, such as a drawing, a character, and a photo, as an electronic file. Examples of the external memory medium 7 are: a memory card that is loaded in a digital camera, a stick-type USB memory, and a read disk drive. The external memory medium 7 is directly or indirectly detachable from the external memory medium I/F unit 8 of the MFP 1.

The external memory medium I/F unit 8 is an intervention means between the MFP 1 and the external memory medium 7. The external memory medium I/F unit 8 can read image data that is stored and saved in the external memory medium 7 into the MFP 1 and can register and save image data that is stored in the MFP 1 to the external memory medium 7 based on a control instruction of the CPU 2. The external memory medium detection unit 9 is located between the external memory medium I/F unit 8 and the CPU 2.

The external memory medium detection unit 9 is configured to detect a detachability condition between the external memory medium 7 and the device main unit based on an instruction from the CPU 2. In other words, it determines whether or not the external memory medium is currently attached to the external memory medium I/F unit 8.

The identification information record unit 10 connects in between the CPU 2 and the data operation unit 12 through a control bus. The identification information record unit 10 records information contents of new image data and a storage location of image data based on an instruction from the CPU 2. An action for recording the identification information is performed after executing functions.

The identification information record unit 10 also has a function, such as erasing and updating identification information that is already recorded. The identification information record unit 10 is configured to record recording contents as shown in FIG. 3 by operating a display panel 13 and an input operation key 14 of the operation panel unit 6 as shown in FIG. 2.

Figures 2, 3:
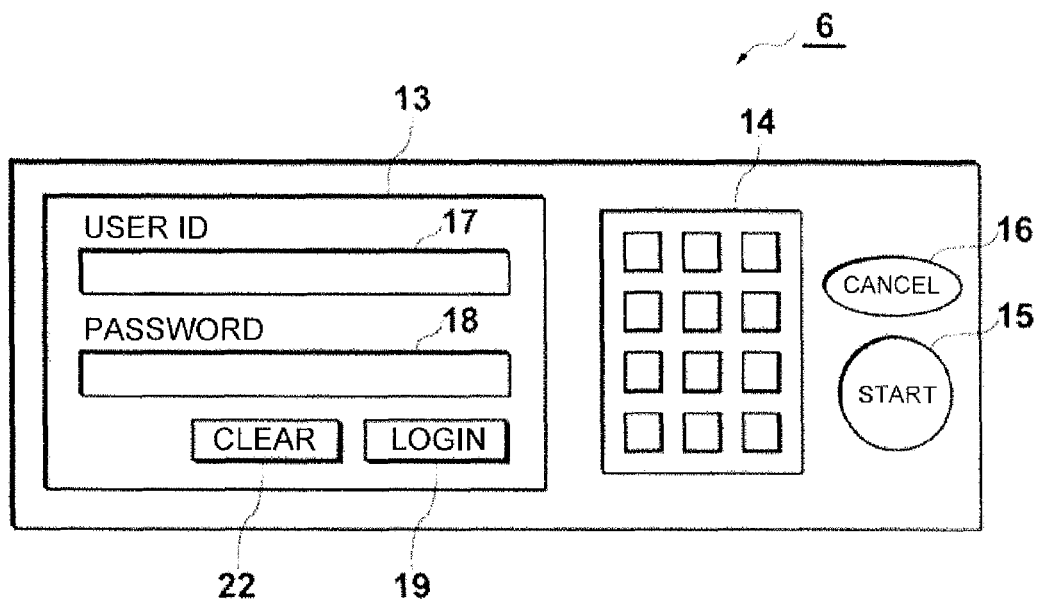
FIG. 2 is a plan view of an operation panel of an MFP according to the first disclosed embodiment.
FIG. 3 is a diagram showing recording contents of an identification information record unit according to the first disclosed embodiment.

FIG. 3 is a diagram showing recording contents of the identification information record unit 10. Other items of contents to be displayed can also be added. As shown in FIG. 3, image data identification information is information that can clearly identify one of the following contents: a file name of image data, a producing date and time of image data, and a user ID and hash value, for example, as a target to be stored for image data.

The storage location clearly shows where the target image data is stored. For example, when image data is stored in a memory card, the storage location could be: "Memory Card;" And when image data is stored in the data temporary storage unit 11, the storage location can be: "Temporary Storage."

The data operation unit 12 connects in between the identification information record unit 10 and the external memory medium I/F unit 8 through various buses and in between the CPU 2 and the external memory medium I/F unit 8 through various buses.

The data operation unit 12 moves only image data that is to be used from among other image data that are stored in the external memory medium 7 to the data temporary storage unit 11. The data operation unit 12 moves the image data using the external memory medium detection unit 9 based on an instruction of the CPU 2. The image data that is moved is recorded by identification information of the identification information record unit 10.

In contrast, the data operation unit 12 has a function to output image data that is stored in the data temporary storage unit 11 to the external memory medium 7 through the external memory medium I/F unit 8 based on an instruction of the CPU 2.

The data operation unit 12 further has a function to move image data that is stored in the external memory medium 7 to the data temporary storage unit 11 when a certain period of time has passed after a user finishes using the MFP 1, and when a certain period of time has passed after an operation is finished.

The data temporary storage unit 11 connects to the data operation unit 12 through various buses. The data temporary storage unit 11 receives and stores image data from the external memory medium 7 based on an instruction of the CPU 2 and an operation of the data operation unit 12.

The image data that is stored in the data temporary storage unit 11 is displayed at the display panel 13 in the operation panel unit 6 based on an instruction of the CPU 2 and an operation of the data operation unit 12.

The data temporary storage unit 11 is assembled to inside the device main unit in the same manner of the storage unit 5. In this embodiment, the data temporary storage unit 11 is a nonvolatile rewritable memory device, such as a nonvolatile memory, a flash memory, or the like. The data temporary storage unit 11 may also be realized as a magnetic storage device, such as a hard disk.

Such memory mediums are not limited to ones that are assembled inside of the device main unit. An external hard disk, an information processing device that connects to the device main unit through a network, and so on, may be provided as the memory mediums provided that it is possible for them to access the device main unit.

In the present embodiment, the identification information record unit 10, the data temporary storage unit 11 and the storage unit 5 are separate memory elements within the device main unit. However, in alternate embodiments, those units may be formed from a single memory element (e.g., they may share the same single hard disk).

The operation panel unit 6 is a user interface (I/F) between the MFP 1 and a user. An example of a display status for a login screen when a user logs in is shown in FIG. 2.

The display panel 13, the input operation key 14, a start button 15, a cancel button 16, and so on are provided at the operation panel unit 6. The display panel 13 is configured with a touch panel system.

The printer unit 4 performs rasterizing of image data based on an instruction from the CPU 2. A digital camera connects to the device main unit through a USB connecter when, for example, electrographic image data is printed. After an electrostatic latent image is formed on a photoreceptor drum based on an instruction of the CPU 2, predetermined toner is adhered to the electrostatic latent image and is transferred onto a photo sheet so that the image data is printed. When image data, such as photo information, is printed, it is preferable to use a special photo sheet. However, that data can also be printed on a regular sheet if desired.

The scanner unit 3 (or image data scanning means) is configured with a glass board for stacking a manuscript that is located at a certain position of an upper part of the device main unit, an illumination lamp that is located at a lower side of the glass board, an optical scanning unit, and an imaging unit. The scanner unit 3 is connected to the CPU 2 through a control bus. An image is scanned from a manuscript (e.g., paper medium) that is placed on the glass board so that the image data is formed.

The storage unit 5 is configured with a volatile or nonvolatile rewritable memory device that is the same as the identification information record unit 10 and the data temporary storage unit 11 and is connected to the CPU 2 through a data bus and so on. The storage unit 5 may be attached to the device main unit as a magnetic storage device, such as a hard disk. Also, the storage unit 5 may be attached to a place to which an information processing device can access, the information processing device being connected through an external hard disk or a network.

Next, operation of the first disclosed embodiment that has the structures discussed above is explained.

Figure 4:
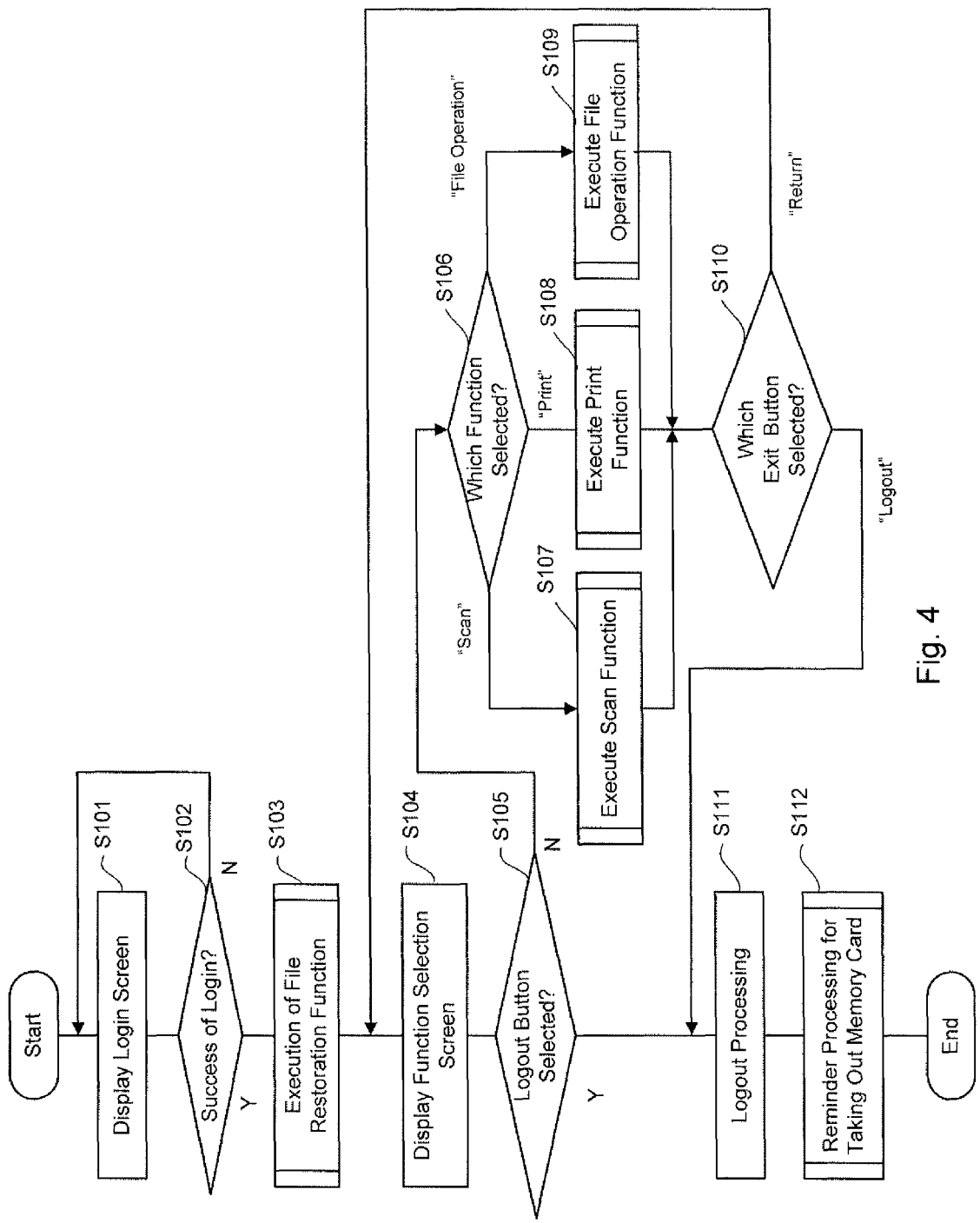
FIG. 4 is a flow diagram showing operation according to the first disclosed embodiment.

FIG. 4 is a flow diagram showing operation according to the first disclosed embodiment. A method of printing image data that was taken by a digital camera through the MFP 1, a method of scanning and storing a printed material, and a method of file operation for stored data, by a user, are explained below with reference to the flow diagram. In the first disclosed embodiment, the case in which the same user continuously is continually using an MFP 1 is explained by way of example.

In some embodiments, the MFP 1 may be connected to the digital camera through a USB connecter in advance. However, in the first disclosed embodiment, a memory card or the like that is taken out from the camera is connected to the MFP 1.

(S101) When a user starts the MFP 1 by turning the power on (not shown) for the MFP 1, a login screen is displayed at the display panel 13 of the operation panel unit 6 as shown in FIGS. 2 and 5. The login screen asks for user ID and password for a user as authentication information. In this display screen, a login button 19 for performing logging in, and a clear button 22 for erasing the contents of text boxes 17 and 18 are displayed in addition to the text boxes 17 and 18 for entering a user ID and password. The user selects an input item according to an instruction of the display panel 13. The user inputs predetermined user ID and password (e.g., a secret number of certain signs and numbers) in each of the text boxes 17 and 18 using the input operation key 14. After that, the user selects the login button 19 (e.g., clicking or pressing it down).

(S102) When the login button 19 is selected, the CPU 2 determines whether or not the authentication information that has been inputted through the login screen (S101) is correct. For example, the CPU 2 compares the inputted information by S101 with a user ID and password that are registered in advance as user information in a memory of the storage unit 5 or the like as shown in FIG. 6. When the inputted information is not registered, an administrator sets them through the display panel 13 of the operation panel unit 6, then the user logs in again. When they are matched (i.e., the authentication is a success), the CPU 2 determines that the login is successful and executes an operation for a file restoration function (S103) and a function selection function (S104). On the other hand, when they are not matched (e.g., authentication is a failure), the display screen does not proceed to a next screen, but is instead returned to the login screen (S101), again by the determination of the CPU 2. As a result, this can prevent a different person than the initial user from seeing the contents of data. In this case, an indication of the failure of authentication can be displayed at the display panel 13.

(S103) When image data that corresponds to the user is not saved in the data temporary storage unit 11, the CPU 2 moves to execute the next function selection screen (S104). When image data is saved in the data temporary storage unit 11, the CPU 2 moves to the function selection execution (S104) after the CPU 2 executes an instruction in which image data that has been moved from a memory card (i.e., the external memory medium 7) to the data temporary storage unit 11 is returned to the external memory medium 7. The user operates the display panel 13 based on whether this is the first time they have logged on or whether it is the second time or later that they are logging on.

(S104) FIG. 7 shows the situation in which the user successfully logs in so that the CPU 2 displays the function selection screen at the display panel 13. In this display screen, a "scan" button 211, a "print" button 212, a "file operation" button 213, and a "logout" button 20 are provided. The "scan" button 211 corresponds to the scanner unit 3; the "print" button 212 corresponds to the printer unit 4, the "file operation" button 213 corresponds to moving and copying image data, and the "logout" button 20 corresponds to a logout operation. As a result, the user can select a function in accordance with the purpose of use.

(S105) The "logout" button 20 of the function selection screen is used, for example, when the user cancels use of the device in the middle of an operation. While the function selection screen is displayed at the display panel 13, the CPU 2 is set to determine whether or not the user selects the logout button 20. When the user does not select the logout button 20, the CPU 2 allows the function selection (S106) to be eligible for operation. When the user selects the logout button 20, the CPU 2 is set to execute operation of logout processing (S111).

(S106) The CPU 2 executes a function that is chosen by the user by determining which function button was selected. When the user needs a scan function, the user selects the "scan" button 211. When the user needs a printer function, the user selects the "print" button 212. When the user needs a file operation function, the user selects the "file operation" button 213. When the user prints in the first disclosed embodiment, image data for a photo from the external memory medium 7 is printed. The user selects the "print" button 212 in the display panel 13.

Figure 10:
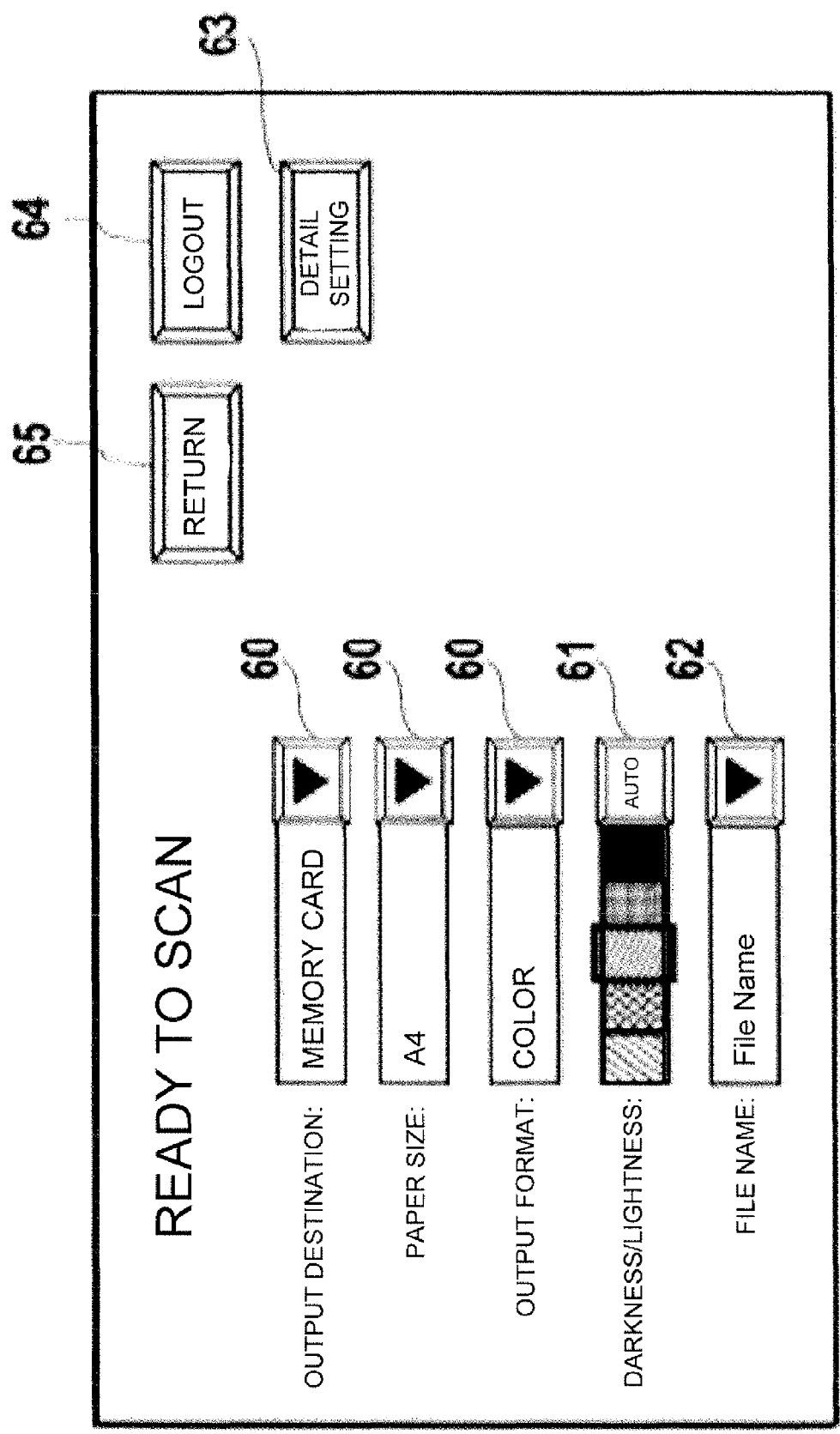
FIG. 10 is an image view showing display contents of an operation panel according to the first disclosed embodiment.

(S107) If the user selects the "scan" button 211, the CPU 2 executes the scan function. Then, a scan function execution screen is displayed at the display panel 13 as shown in FIG. 10. While seeing this screen, the user can select and execute parameters for the scan execution. For example, a scanning manuscript size, a specified darkness/lightness, a destination to save, and so on can be specified.

Figure 8:
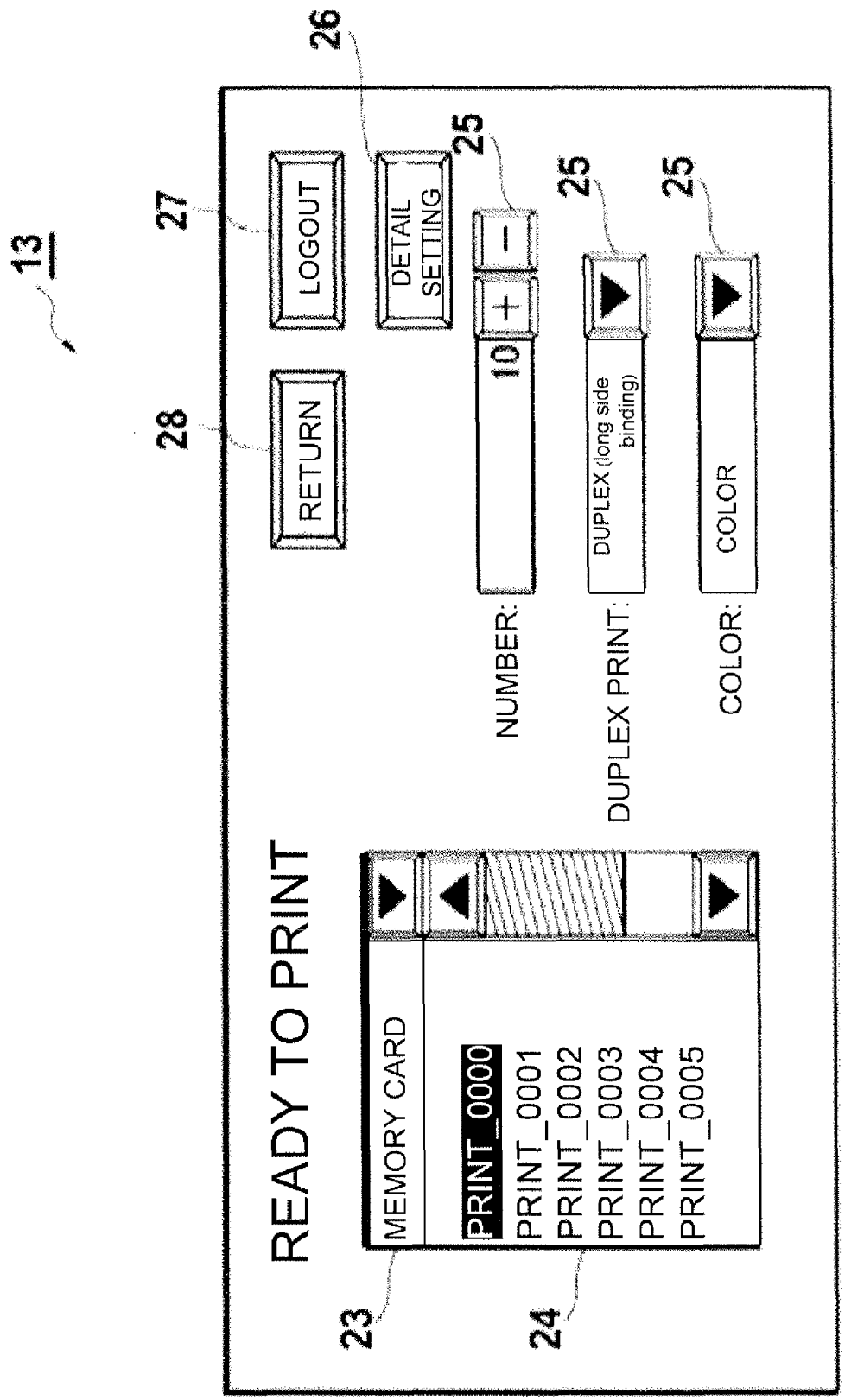
FIG. 8 is an image view showing display contents of an operation panel according to the first disclosed embodiment.

(S108) If the "print" button 212 is selected, a print function execution screen as shown in FIG. 8 is displayed at the display panel 13 based on an execution instruction from the CPU 2. The user operates the display panel 13 in accordance with the display. The user can select either a "memory card" or a "storage unit" through a pull-down menu of a file storage destination field 23 in a display screen of the display panel 13 in FIG. 8. When it is necessary, further detailed settings, such as a number of printing, can be set as additional parameters at the time of the print execution.

In this display screen, a number of input elements can be provided. These can include: a pull-down menu in which a storage destination for an image data file is selected, a list box 24 in which a desired image data is selected, various setting buttons 25 that are for a menu setting for a number of printing, a pull-down menu setting for a method of printing, a pull-down menu setting for color or black and white printing, a detail setting button 26 setting for in detail, a logout button 27, and a return button 28 for ending printing.

When the operation of selecting a file is performed, a plurality of files can be selected in the list box 24.

After the user selects a file and sets a parameter for the print execution, the print unit 4 is driven by selecting the start button 15 at the operation panel unit 6 so that predetermined image data can be printed.

Figure 11:
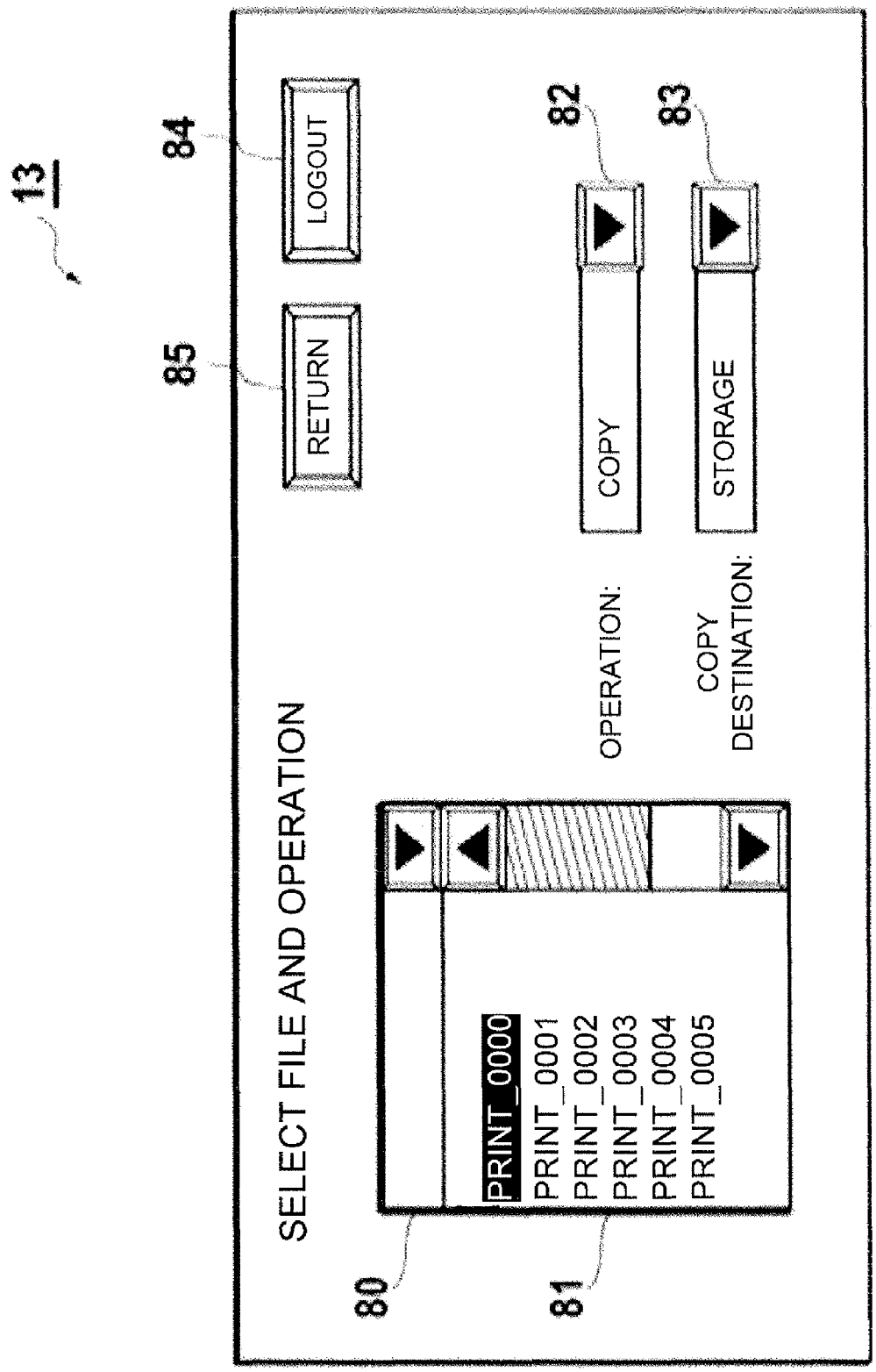
FIG. 11 is an image view showing display contents of an operation panel according to the first disclosed embodiment.

(S109) If the user selects the "file operation" button 213, the CPU 2 executes the file operation function. Then, a file operation function execution screen is displayed at the display panel 13 as shown in FIG. 11. The user can perform operations to copy, move, and erase a selected file based on this screen.

(S110) The user then selects an exit button to end or continue processing. When the user selects the logout button 27, 64, or 84 (S110), the CPU 2 proceeds the logout process (S111). When the user selects return button 28, 65, or 85, the operation is returned to S104.

(S112) After performing the logout process (S111), the CPU 2 performs determination of whether it is necessary to issue a reminder for taking out an external memory medium. When a certain period of time passes during which the external memory medium remains attached to the MFP 1, or when a certain period of time passes during which the user does not operate the device, only image data that was most lately printed among other image data in the external memory medium 7 is moved to the data temporary storage unit 11 by the data operation unit 12 based on a program instruction of the CPU 2. Then, the CPU 2 ends the operation.

Figure 9:
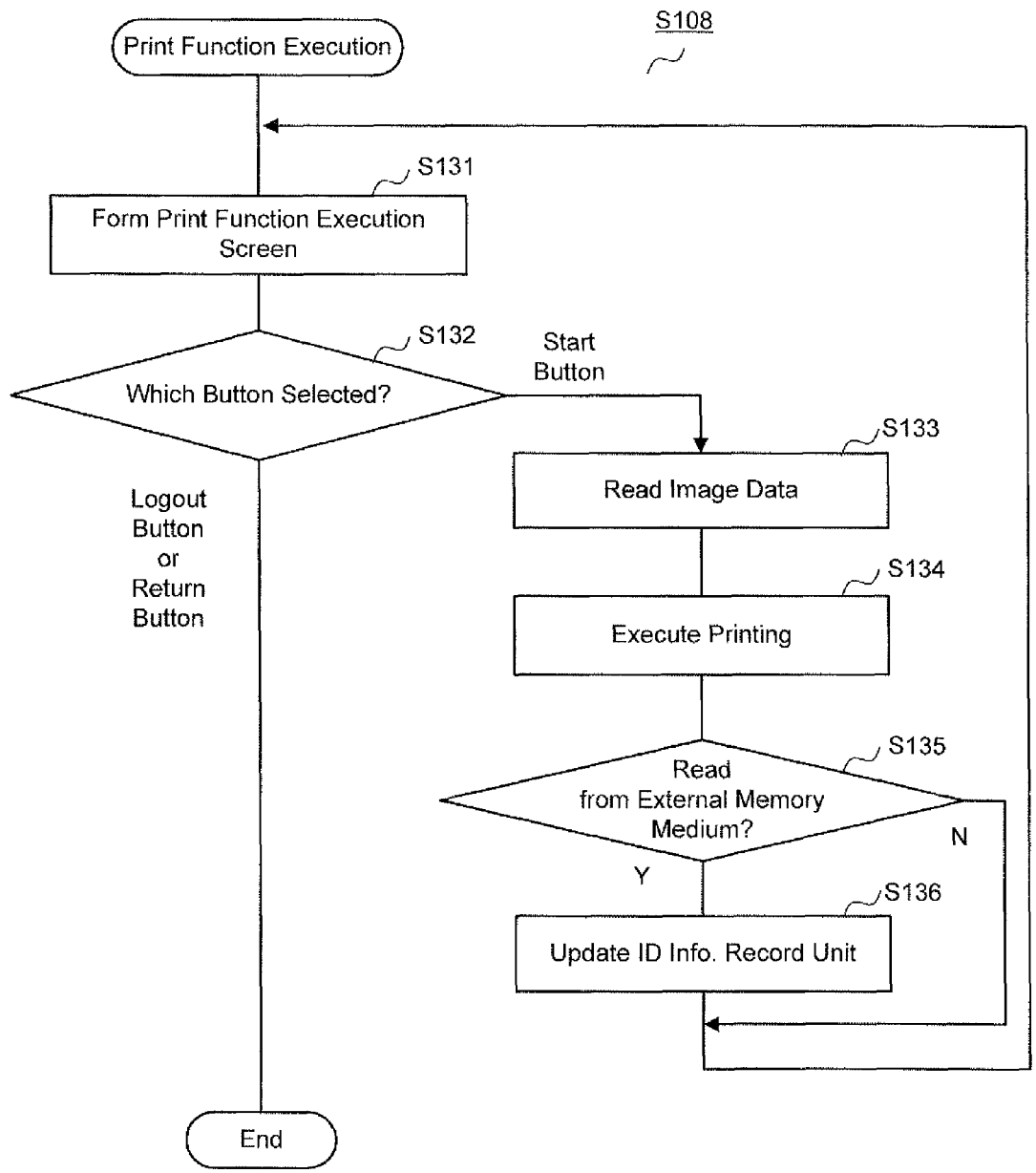
FIG. 9 is a flow diagram showing a print operation according to the first disclosed embodiment.

Next, execution of various selectable functions is explained in detail. The print function in which image data of the external memory medium 7 is printed is performed in accordance to a flow diagram in FIG. 9. In this case, this operation provides additional detail with respect t to element S108 in FIG. 4.

(S131) The CPU 2 forms the print function execution screen in the display panel 13 of the operation panel unit 6. The user can select a file for image data to be printed and specify parameters for the print execution by using this screen. The storage destination for a file is either in the storage unit 5 of the MFP 1, in an information processing device that is connected through a network (not shown) or the external memory device 7 and so on. The parameters for the print execution can include: a number for printing, a selection of one side printing or duplex printing, a setting for a binding margin, a selection of color or black and white, and so on. The print function execution screen is displayed at the display panel 13 in the MFP 1 as shown in FIG. 8. The user sets a parameter through the image processing device, the user selects the start button 15 to start printing.

(S132) When the CPU 2 determines that the start button 15 is selected at S131, the CPU 2 executes processing of S133. On the other hand, when the logout button 27 or the return button 28 is selected, the CPU 2 ends the procedure.

(S133) The CPU 2 reads a file that is specified in S131 as image data. The image data that is read is passed to the printer unit 4.

(S134) The printer unit 4 performs rasterizing of the image data and executes the data in a printing processing.

(S135) After the printing is executed, the CPU 2 determines where the image data is read from. Specifically, the CPU 2 determines whether an origin is the external memory medium 7 or another location. When the origin is the external memory medium 7, processing is moved to S136. When the origin is other than the external memory medium 7, the procedure is returned to S131. Then, the process waits for either the next print settings or an indication to end the printing processing.

(S136) The CPU 2 records a user ID of the user who uses the MFP 1, and a file name and a storage location of a file that is read at S133 in the identification information record unit 10 (Update ID Info. Record Unit). For example, when the user ID is "0000", and the file name is "PRINT0000," the contents of row no. 2 in FIG. 3 are recorded in the identification information record unit 10. Because the image data that is read is stored in a memory card as the external memory medium 7, the storage location is recorded as "memory card."

Figure 12:
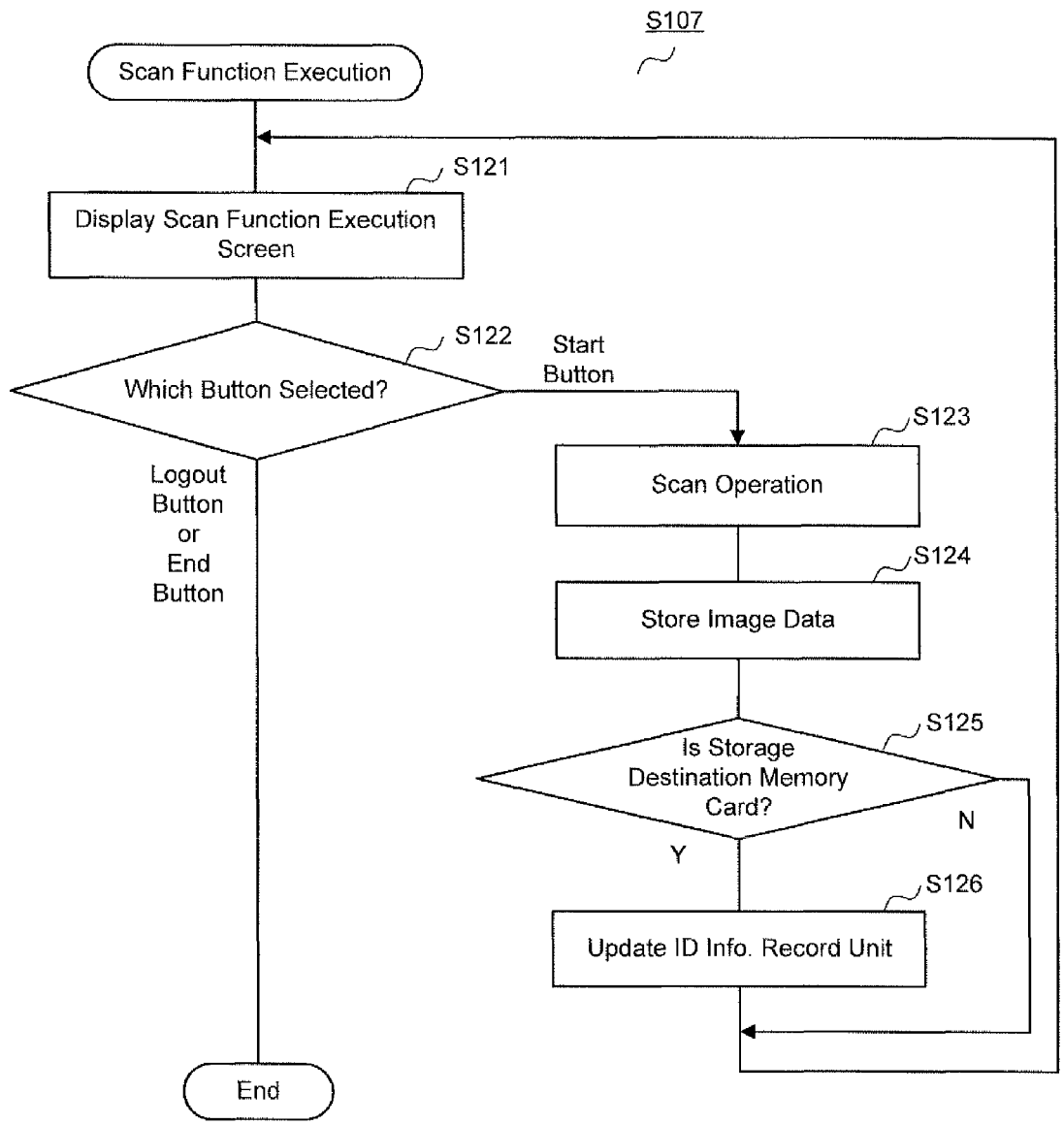
FIG. 12 is a flow diagram showing a scan operation according to the first disclosed embodiment.

Next, a case is explained, in which a photo, for example, in a paper medium is stored as image data by using the scan function. FIG. 12 is a flow diagram for the case. In this case, the procedure provides more detail for element S107 in FIG. 4.

(S121) The user operates the operation panel unit 6 of the MFP 1, so that the scan function execution screen is displayed at the display panel 13. The user then specifies parameters for the scan execution in accordance to the display panel 13. For example, the user may specify a size of scanning manuscript, darkness/lightness, color or black and white, and so on. Because image data that is formed by the scanner unit 3 is saved as a file, the user can specify storage destinations, such as the storage unit 5, and the external memory medium 7. An information processing device (not shown) that is connected to the MFP 1 through network may be used as the storage destination. FIG. 10 shows an example of the scan function execution screen displayed at the display panel 13. An output destination, a size of scanning manuscript, color or black and white scan (output format), a pull-down menu 60 specifying various things, a slider 61 specifying darkness/lightness, a text box 62 in which an output file name is entered, and a detail setting button 63 for setting detail things are provided in the display panel 13. A logout button 64 for executing logout and a return button 65 for ending the scan function are also provided. After the user sets desired items, the user selects the start button 15 in the operation panel unit 6. Then, the procedure moves to S123 through S122 so that the scan is executed. When the logout button 64 or the return button 65 is selected, the procedures end.

(S122) The CPU 2 determines which button is selected. If either the logout button 64 or the return button 65 is selected, the processing flow is finished. However, if the start button 15 is selected, the procedure of S123 is performed.

(S123) The scanner unit 3 scans an image from a paper medium (photo) and forms image data. The image data that is formed is sent to the CPU 2.

(S124) The CPU 2 stores the image data that is formed at S123 in a location that is specified at S121. When a file name is specified at S121, the file name is assigned for the image data. However if a file name is not specified, the CPU 2 decides the file name. In the disclosed embodiment, the file name is assigned by the CPU 2 as "SCAN*" (where * is a sequential number from 0000). However, alternate embodiments can employ other naming schemes.

(S125) The CPU 2 determines whether or not the storage destination of the image data in S124 is the "memory card" as the external memory medium 7. When the storage destination of the image data is the "memory card," the processing of S126 is performed. When the storage destination is other than the "memory card," the processing returns to S121.

(S126) The CPU 2 records the user ID of the user using the MFP 1 and the file name and the storage location of the file that is stored at S124 in the identification information record unit 10 (Update ID Info. Record Unit). For example, in the disclosed embodiment, when the user ID is "0000," and the file name is "SCAN0000," the contents of row no. 1 in FIG. 3 are recorded in the identification information record unit 10. Because the image data that is formed is stored in a memory card as the external memory medium 7, the storage location is recorded as "memory card."

Figure 13:
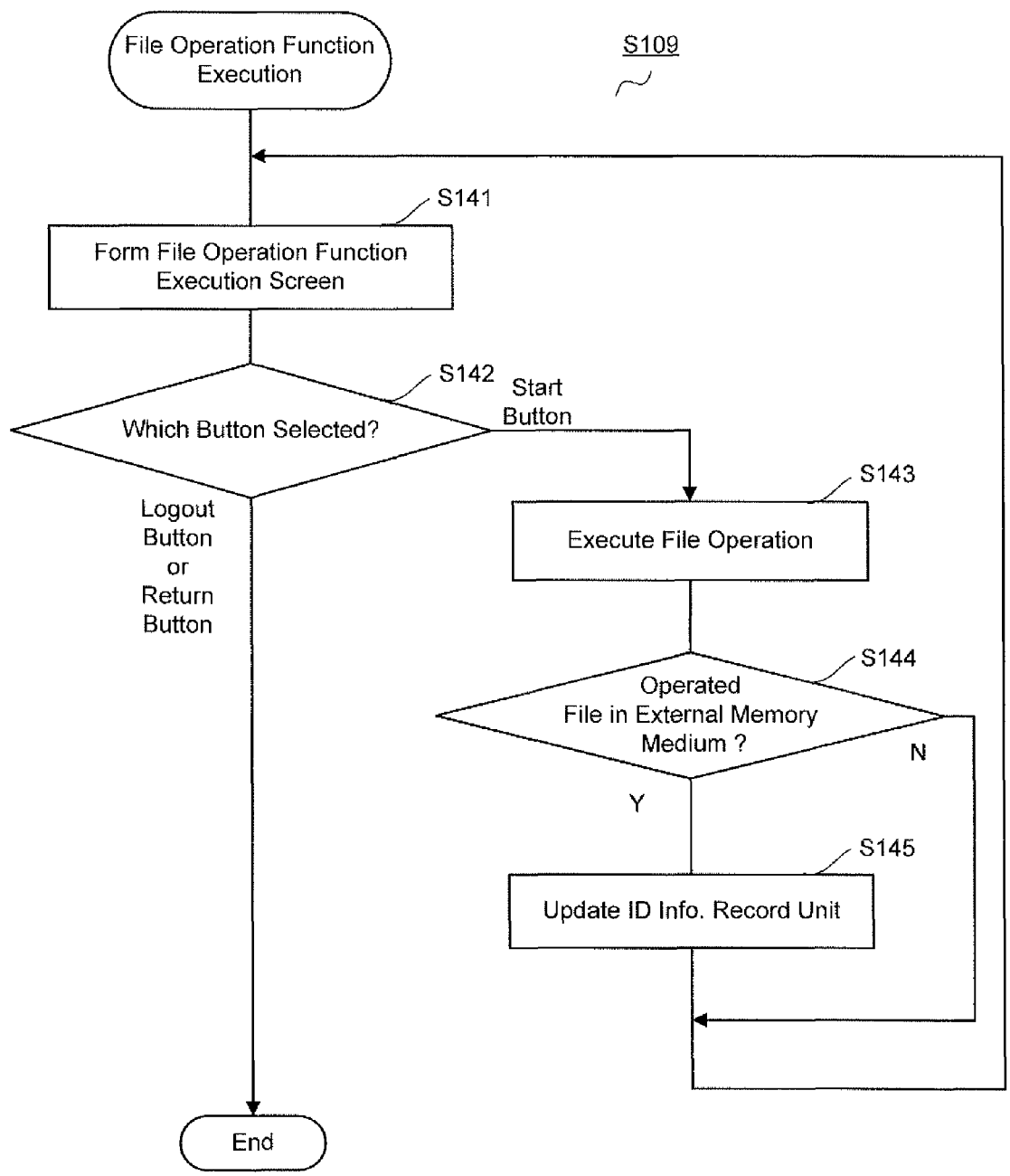
FIG. 13 is a flow diagram showing a file operation according to the first disclosed embodiment.

A file operation function is further explained. FIG. 13 shows a flow diagram for the case in which the CPU 2 of the MFP 1 executes the file operation function. The procedure further defines element S109 in FIG. 4.

(S141) The CPU 2 forms the file operation function execution screen in the display panel 13 of the operation panel unit 6. The user selects a file that is to be operated on and the parameters of the procedure, and executes performance of that procedure by using this screen. Storage destinations for the file that is to be operated on include: the storage unit 5 of the MFP 1, the data temporary storage unit 11, or an information processing device that is connected to the MFP 1 through a network, and a "memory card" if the external memory medium 7 is attached to the MFP 1. Selectable procedures include: "copy," "move," and "erase." When the user selects copy or move at the operation panel unit 6, the user selects the "copy," or "move" procedures, respectively for the file.

FIG. 11 is an example of the file operation function execution screen that is displayed at the display panel 13. The display panel 13 in this operation includes: a pull-down menu 80 for selecting the storage destination of a file that is to be operated on, a list box 81 for selecting a file, a pull-down menu 82 for selecting an operation that is to be executed, and a pull-down menu 83 for selecting a move or copy destination. A logout button 84 for performing a logout procedure logout and a return button 85 for ending the file operation function are also provided. In the list box 81 in which the file is selected, one or more files can be selected. After the user selects the desired file that is to be operated on, and the performance parameters, the user selects the start button 15 of the operation panel unit 6. As a result, the procedure moves to S143 via S142 so that the file operation processing is executed. When the logout button 84 or the return button 85 is selected, the procedure ends via S142.

(S142) The CPU 2 determines which button is selected. If the logout button 84 or the return button 85 is selected at S141, the processing flow is finished. However, if the start button 15 is selected, the procedure of S143 is performed.

(S143) The CPU 2 executes a file operation that is specified at S141 by the user.

(S144) When the CPU 2 executes the procedure of S143, the CPU 2 determines whether or not the operated file is present in the external memory medium 7. The following are examples of situations in which this determination is made: the file is copied or moved from the storage unit 5 to a memory card; and the file is copied from the memory card to the storage unit 5. When the file is present in the external memory medium 7, the procedure moves to S145. When the file is not in the external memory medium 7, the procedure returns to S141.

(S145) The CPU 2 records the user ID of the user using the MFP 1, the file name, and the storage location of the file that is being operated on at S142 in the identification information record unit 10 (Update ID Info. Record Unit). For example, in the disclosed embodiment, when the user ID is "0000," and the file name is "PRINT0000," the contents of row no. 2 in FIG. 3 are recorded in the identification information record unit 10. Because the specified file is stored in the memory card as the external memory medium 7, the storage location is recorded as "memory card."

Figure 14:
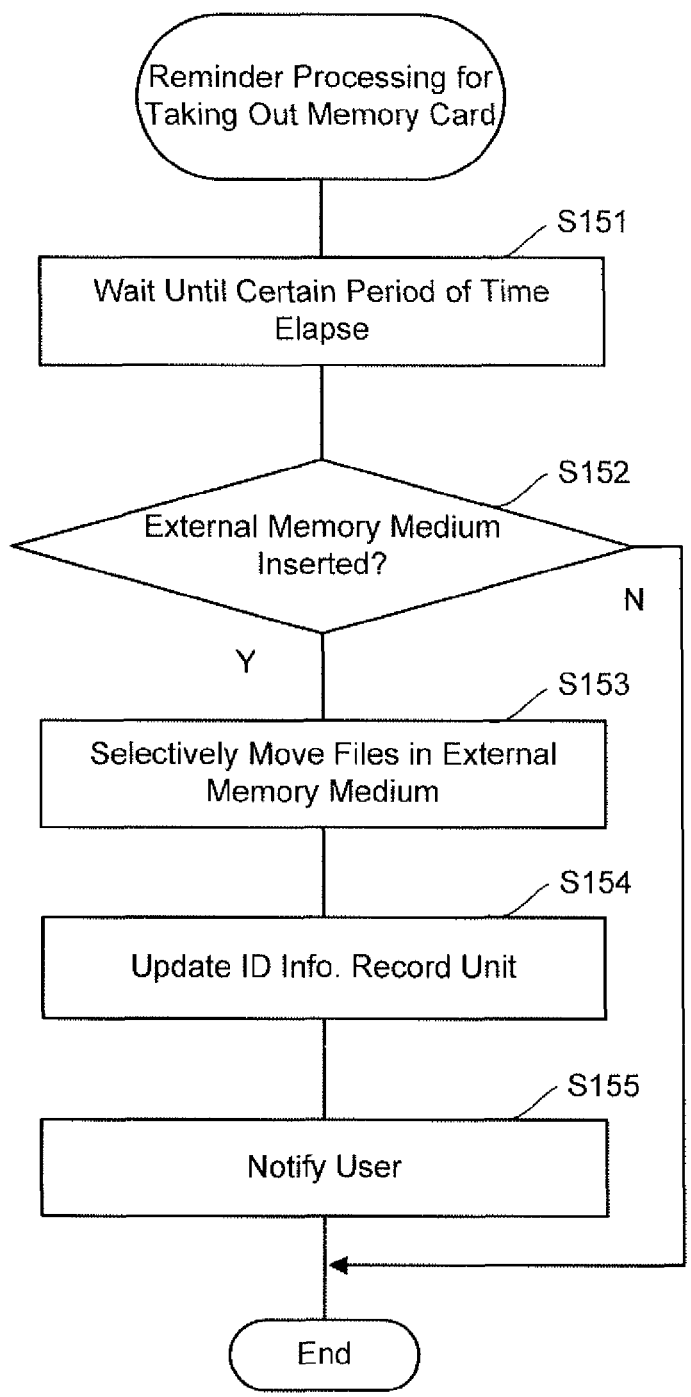
FIG. 14 is a flow diagram showing a reminder processing for a user to take out a memory card according to the first disclosed embodiment.

A reminder processing for a user to take out the external memory medium 7 is explained below. FIG. 14 is a flow diagram of an execution program with respect to the reminder processing for taking out the external memory medium 7. This flow begins after S111 in FIG. 4 and is an expansion of S112. In this exemplary embodiment, it is assumed that the procedures proceed after the user who has the user ID, "0000," logs out.

(S151) The CPU 2 waits until a certain period of time elapses.

(S152) The CPU 2 determines whether or not the external memory medium 7 is inserted in the external memory medium I/F unit 8 by asking the external memory medium detection unit 9. If the external memory medium 7 is inserted in the MFP 1, the CPU 2 executes the processing of S153. If the external memory medium 7 is not inserted in the MFP 1, the processing ends.

(S153) The CPU 2 instructs the data operation unit 12 to move a file that is stored in the external memory medium 7. The data operation unit 12 selectively moves the file that is stored in the external memory medium 7 to the data temporary storage unit 11 based on the file information that is recorded at the identification information record unit 10. Specifically, a file name that has the following two conditions is selected: the user ID in the identification information record unit 10 is the latest user ID that is logged out from the MFP 1, and the storage location is "memory card" that means the external memory medium 7. Here, a row that has the following two conditions is selected: the user ID is "0000," and the storage location is "memory card." So, rows no. 1 and no. 2 in FIG. 3 are selected. File names, "SCAN0000" and "PRINT0000," in the rows are obtained. The files that have the file obtained names are then moved from the external memory medium 7 to the data temporary storage unit 11.

(S154) The CPU 2 updates the contents of the identification information record unit 10. Specifically, the storage location of the row in which the file name corresponding to the file that is moved at S153 is written is updated to rewrite as "temporary storage." The storage locations for row no. 1 and row no. 2 in FIG. 3 are rewritten from "memory card" to "temporary storage" to assure that the system is safe from information leaks.

(S155) The CPU 2 then notifies the user of two things: that the external memory medium 7 is still attached to the MFP 1, and that the content of the external memory medium 7 has been moved to the MFP 1. In the disclosed embodiment, the CPU 2 sends an email to the user. An email address is registered in the identification information record unit 10 with its user ID and is obtained from the table shown in FIG. 6. In alternate embodiments, however, other methods of notification can be used.

In S153, the file of the image data that is moved from the external memory medium 7 to the data temporary storage unit 11 may be encrypted so that the encrypted file may be stored in the data temporary storage unit 11. Also, in S153, an area in the external memory medium 7 where the moved file was recorded may be overwritten as, for example, "0" or a set of random numbers. Thus, when the user logs out while the external memory medium 7 is still attached, a different person as a next login user cannot use the data in the external memory medium 7. As a result, the security of the system is improved.

Second Disclosed Embodiment

Figure 15:
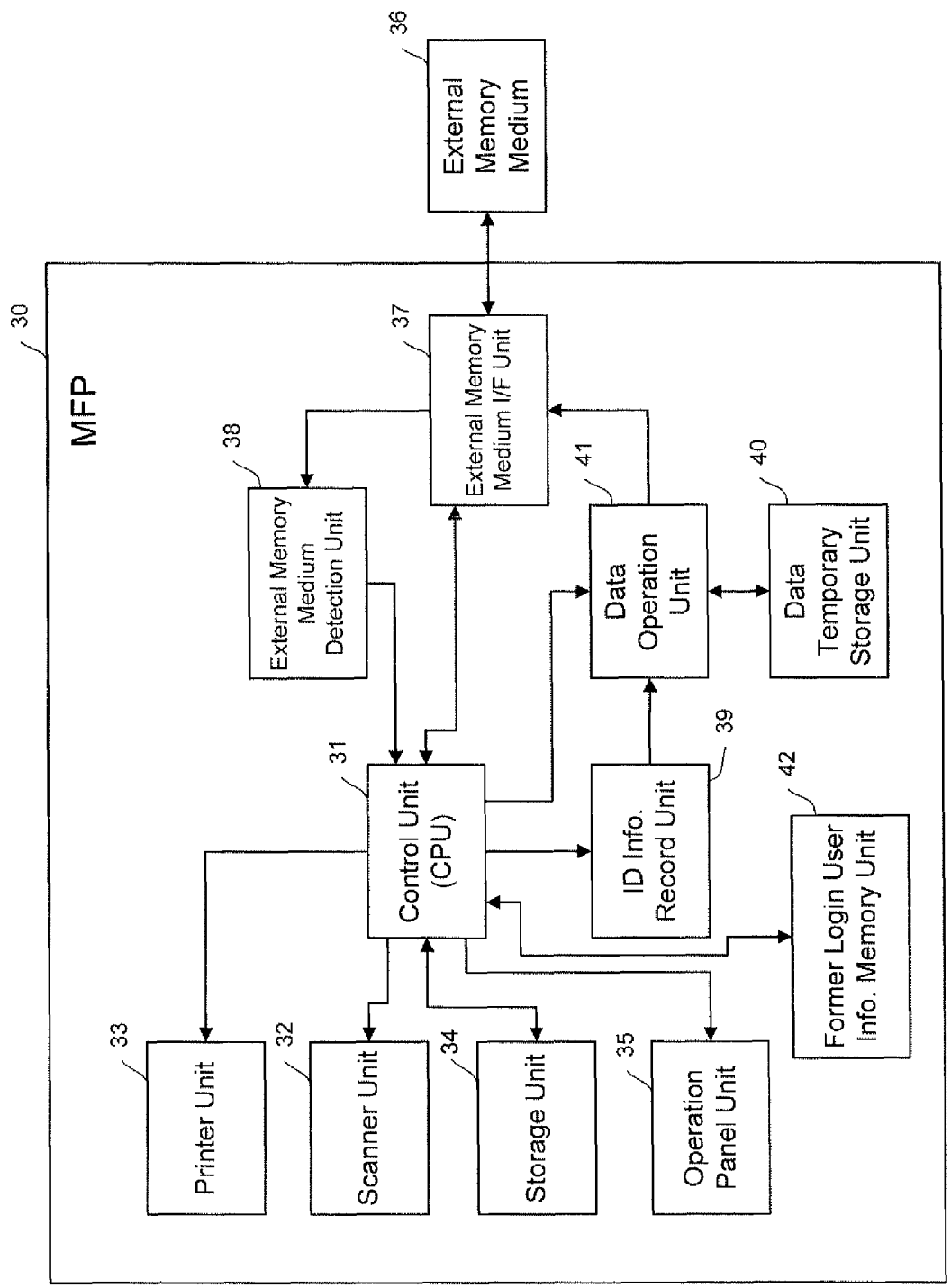
FIG. 15 is a block diagram of a basic structure of an MFP according to a second disclosed embodiment of the present application.

FIG. 15 is a block diagram showing a structure of a MFP 30 as an image producing device, an image forming device, and an image processing device according to a second disclosed embodiment of the present application. As shown in FIG. 15, the second disclosed embodiment has the similar structures as the first disclosed embodiment so that explanations of such similar structures are omitted. Different structures are explained.

As shown in FIG. 15, the MFP 30 has a control unit 31 (hereinafter referred to as a CPU), a scanner unit 32 that connects the CPU 31 through a control bus or the like and that is as an image producing unit, a printer unit 33 that is as an image forming unit, a storage unit 34 that is as an image recording unit, and an operation panel unit 35.

An external memory medium interface (I/F) unit 37 for an external memory medium (memory card, memory disk or the like) 36, an external memory medium detection unit 38, an identification information record unit 39, a data temporary storage unit 40, and a data operation unit 41 connect to the CPU 31 of the MFP 30. Further, a former login user information memory unit 42 is connected to the CPU 31 through a control bus or the like.

The former login user information memory unit 42 records as electronic date identification information of a user who has used the MFP 30 one or more times in the past.

When identification information of a user who starts to use the MFP 30 through the data operation unit 41 and information that is recorded in the former login user information memory unit 42 are different, image data that is stored in the external memory medium 36 is moved to the data temporary storage unit 40.

Because the information of the user here is a user ID, the former login user information memory unit 42 records the user ID.

The user ID is displayed at the operation panel unit 35 as shown in FIG. 6. When the user uses the MFP 30 and logs out, the contents of the former login user information memory unit 42 is updated.

Structures other than the former login user information memory unit 42 are the same as the first disclosed embodiment so that its explanation is omitted.

Next, operation of the second disclosed embodiment is explained by using the same example as the first disclosed embodiment. The case in which photo image data or the like that is registered in the external memory medium (e.g., memory card) 36 is printed by using the MFP 30 is explained.

In the second disclosed embodiment, it is assumed that a different person (i.e., anyone than the initial user) will use the MFP 30 later.

Figure 16:
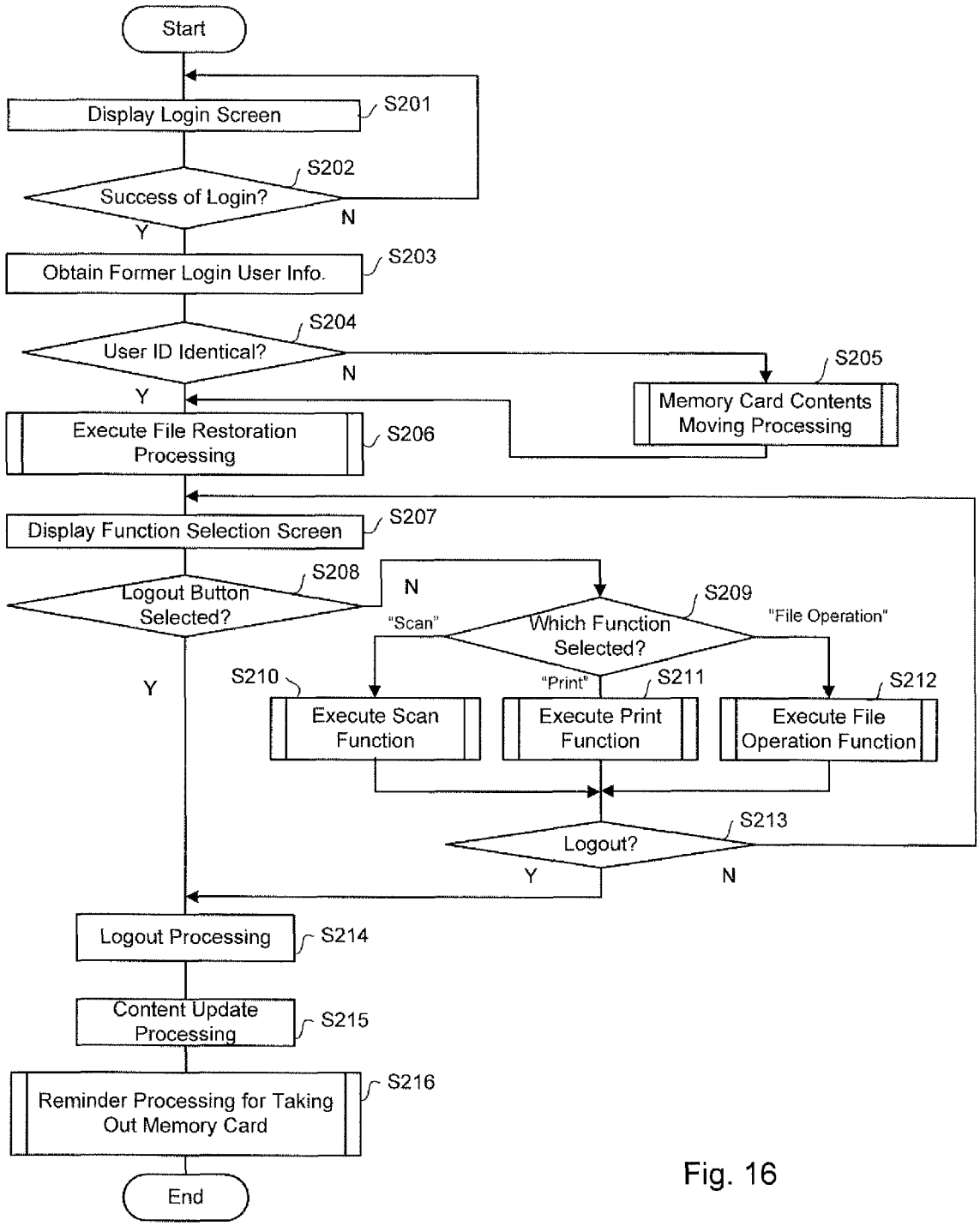
FIG. 16 is a flow diagram showing operation according to the second disclosed embodiment.

(S201) FIG. 16 is a flow diagram showing brief procedures according to the second disclosed embodiment. When a user turns on the power of the MFP 30 (not shown), the MFP 30 is activated. Then, the operation panel unit 35 displays as shown in FIG. 2 (Display Login Screen).

(S202) A login procedure is performed and the CPU determines if the login procedure was successful. The user enters a specified user ID into text boxes 17 and 18 using the input operation key 14 and then selects a login button 19. If the login procedure is successful, then the procedure moves to S203. If the login procedure fails, processing returns to S201.

(S203) The former user ID is obtained from the former login user information memory unit 42.

(S204) The CPU 31 compares a user ID of a user who just logs in with the former login user ID that is obtained at S203, and determines whether or not they are identical. If they are identical (Yes), the CPU 31 moves to S206 so that file restoration processing is executed. If they are different (No), the CPU 31 moves to S205 so that memory card content moving processing is executed.

(S205) When the CPU 31 determines that the user is different from the former user, the data operation unit 41 executes the moving processing for image data in the external memory medium 36 into the data temporary storage unit 40 in accordance to a program instruction of the CPU 31.

Figure 17:
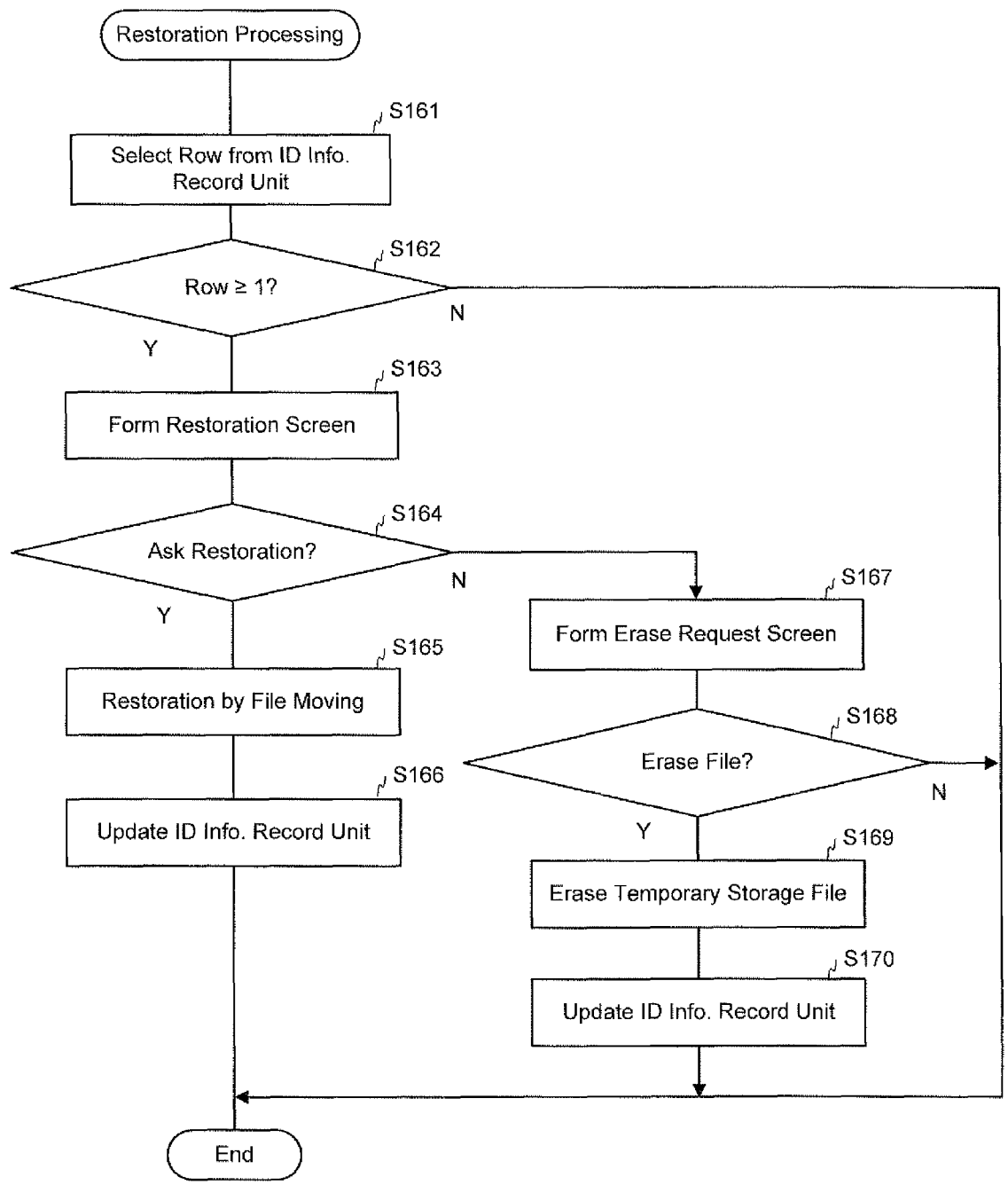
FIG. 17 is a flow diagram showing a restoration processing operation according to the second disclosed embodiment.

(S206) The CPU 31 executes the "file restoration processing" function described below with respect to a flow diagram of FIG. 17.

(S207) The CPU 31 displays the function selection screen at the display panel 13 in FIG. 7.

(S208) While the function selection screen is displayed at the display panel 13, the CPU 31 is configured to determine whether or not the user selects a logout button 20. If the user does not select the logout button 20, the CPU 31 moves to an execution of a function selection processing (S209). If the user selects the logout button 20, the CPU 31 executes procedures for logout processing (S214).

(S209) The CPU 31 executes a function that is chosen by the user by determining which function button was selected. When the user needs a scan function, the user selects the "scan" button 211. When the user needs a printer function, the user selects the "print" button 212. When the user needs a file operation function, the user selects the "file operation" button 213. When the user prints in the first disclosed embodiment, image data for a photo from the external memory medium 36 is printed. The user selects the "print" button 212 in the display panel 13.

(S210) If the user selects the "scan" button 211, the CPU 31 executes the scan function. Then, a scan function execution screen is displayed at the display panel 13 as shown in FIG. 10. While seeing this screen, the user can select and execute parameters for the scan execution. For example, a scanning manuscript size, a specified darkness/lightness, a destination to save, and so on can be specified.

(S211) If the "print" button 212 is selected, a print function execution screen as shown in FIG. 8 is displayed at the display panel 13 based on an execution instruction from the CPU 31. The user operates the display panel 13 in accordance with the display. The user can select either a "memory card" or a "storage unit" through a pull-down menu of a file storage destination field 23 in a display screen of the display panel 13 in FIG. 8. When it is necessary, further detailed settings, such as a number of printing, can be set as additional parameters at the time of the print execution.

(S212) If the user selects the "file operation" button 213, the CPU 31 executes the file operation function. Then, a file operation function execution screen is displayed at the display panel 13 as shown in FIG. 11. The user can perform operations to copy, move, and erase a selected file based on this screen.

Because the second disclosed embodiment relates to printing photo image data of a digital camera, it is assumed that a "print" button 212 of the display panel 13 in FIG. 7 is selected in the same manner as the first disclosed embodiment. When the "print" button 212 is selected, a display screen of FIG. 8 is shown at the display panel 13 based on an execution instruction from the CPU 31. The user operates the display panel 13 in accordance to this screen. After the user selects a file for image data and sets a parameter for a print execution, the user then selects a start button 15. As a result, the printer unit 33 is activated. Specified image data is printed.

(S213) The CPU 31 determines whether the logout button 20 or any of return buttons 28, 65 and 85 has been selected if the user selects the logout button 20 or an end button (Logout, Yes), the CPU 31 executes the logout processing (S214), executes a content update processing (S215) for the former login user information memory unit 42, executes reminder processing for taking out a memory card (S216), and finishes the procedures. As a result, even though a different person than the initial user uses the MFP 31 later while the memory card is attached to the MFP 31, the different person cannot see the contents of data in the external memory medium 36.

Also, this process prevents all of the data in the external memory medium 36 from being moved to the data temporary storage unit 40 in the device main unit side.

In the content update processing of the former login user information (S215), the former longin user information unit 42 is updated based on the user ID which is inputted by the user at S201.

Figure 18:
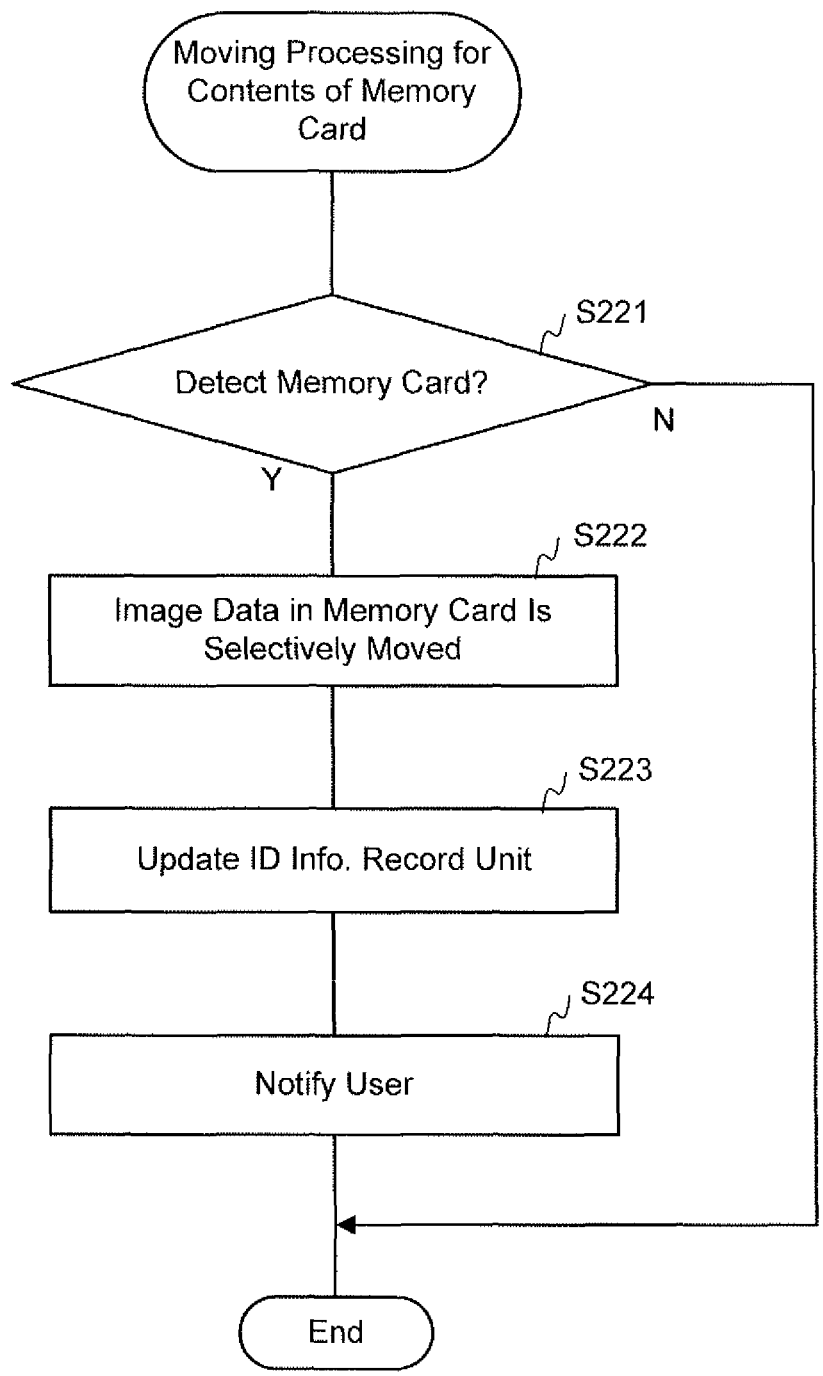
FIG. 18 is a flow diagram showing a moving processing operation for contents of a memory card according to the second disclosed embodiment.

FIG. 18 is a flow diagram showing a moving processing for the contents of data in the external memory medium 36.

Even though the former user keeps the external memory medium 36 attached to the device main unit for a while, only the image data in the external memory medium 36 that is used in the past is moved to the data temporary storage unit 40 (S221-S224). The procedure is executed at the memory card content moving processing (S205) in FIG. 16. In this case, the image data, for example, may be overwritten with encrypted random numbers. When the encrypted image data is returned to the external memory medium 36, the encrypted image data is then decoded.

Next, restoration processing is explained, in which image data that is stored in the data temporary storage unit 40 is restored to the external memory medium 36. FIG. 17 is a flow diagram and the procedure begins after S103 in FIG. 4 and S205 in FIG. 16. In this disclosed embodiment, a user ID of a user who logged in at the previous login processing is "0001." And all of storage locations in the identification information record unit 39 are "temporary locations." In other words, it is the states after S154. The flow in FIG. 17 is performed as described below.

(S161) First, the CPU 31 selects a row from the identification information record unit 39. In this disclosed embodiment, a row in which a user ID is for a currently logged on user, and in which a storage location is a "temporary storage," is selected. For example, row Nos. 3 and 4 in FIG. 3 is selected.

(S162) The CPU 31 determines whether or not the number of the row selection at S161 is equal to or more than one. When the row number of the selection is equal to or more than one (Yes), the CPU 31 moves to S163. When it is zero (No), the CPU 31 ends the procedure.

Figure 19:
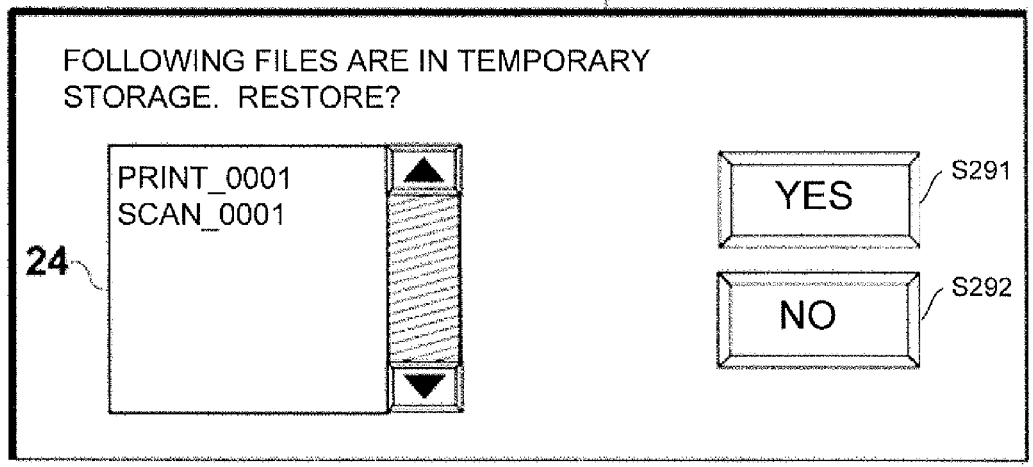
FIG. 19 is an image view showing display contents of an operation panel according to the second disclosed embodiment.
Figure 20:
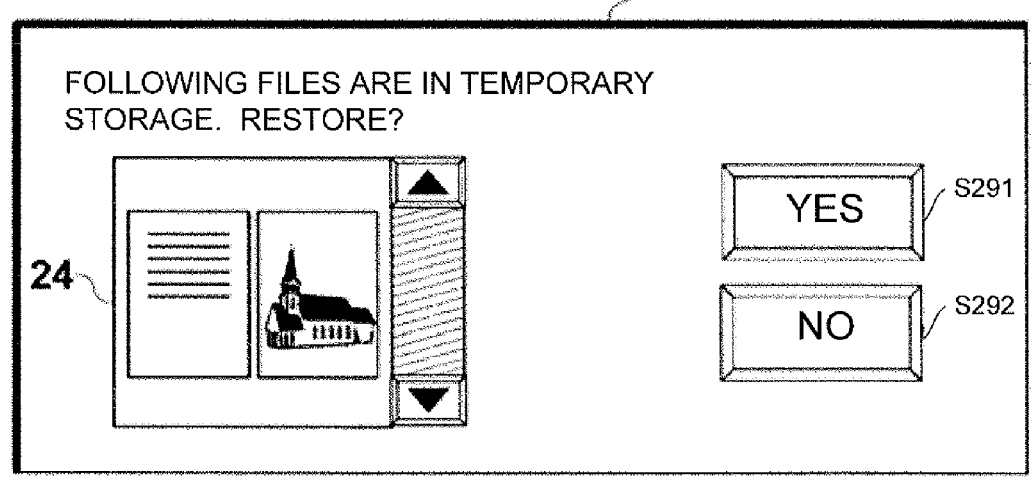
FIG. 20 is an image view showing display contents of an operation panel according to the second disclosed embodiment.

(S163) The CPU 31 forms a restoration screen at a display panel in the operation panel unit 35 that asks the user whether or not image data that is stored in the data temporary storage unit 40 should be restored to the external memory medium 36. Specifically, the CPU 31 forms a screen that asks whether or not a file that is recorded in the obtained row at S161 should be restored to the external memory medium 36. An exemplary screen for asking about the file restoration is shown in FIG. 19. In this screen, there is a list 24 for displaying a file name of a file that is restored, a "YES" button 291 for indicating that the restoration should be performed, and a "NO" button 292 for indicating that the restoration should not be performed. In the display panel 13, a thumbnail that represents the contents of the file may be displayed as shown in FIG. 20 instead of the file name.

(S164) When the CPU 31 determines that the user has selected to restore the image data to the external memory medium 36 as a result of S163 (i.e., when the user selects the 'YES' button 291), the CPU 31 moves to S165. If, however, the CPU determines that the user has selected not to restore the image data to the external memory medium 36 as a result of S163 (i.e., the user selects the "NO" button 292), the CPU 31 moves to S167.

(S165) The CPU 31 instructs the data operation unit 41 to restore the image data that is stored in the data temporary storage unit 40 to the external memory medium 36. The data operation unit 41 chooses a file that corresponds to the file name of the row obtained at S161 among the image data stored in the date temporary storage unit 40, then move the file to the external memory medium 36 (Restoration by File Moving). In this exemplary embodiment, the files with the file names, "PRINT_0001" and "SCAN_0001," are moved from the data temporary storage unit 40 to the external memory medium 36.

(S166) The CPU 31 then changes the contents of the identification information record unit 39 (Update ID info. Record Unit). Specifically, the storage location of the row obtained at S161 is overwritten as "memory card." Namely, the content is updated. Here, the storage location of row Nos. 3 and 4 in FIG. 3 is overwritten from "temporary storage" to "memory card." And then, the processing is finished.

Figure 21:
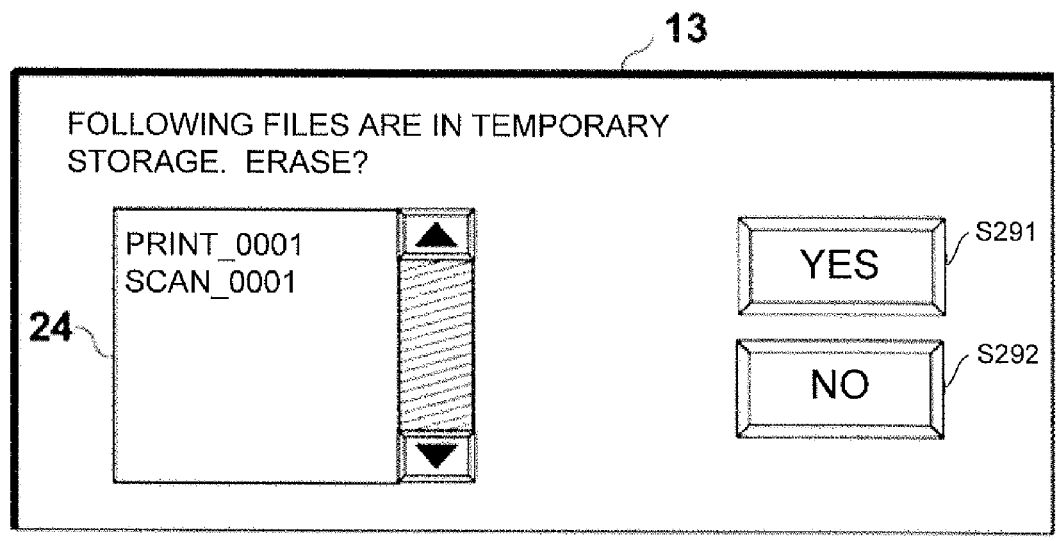
FIG. 21 is an image view showing display contents of an operation panel according to the second disclosed embodiment.
Figure 22:
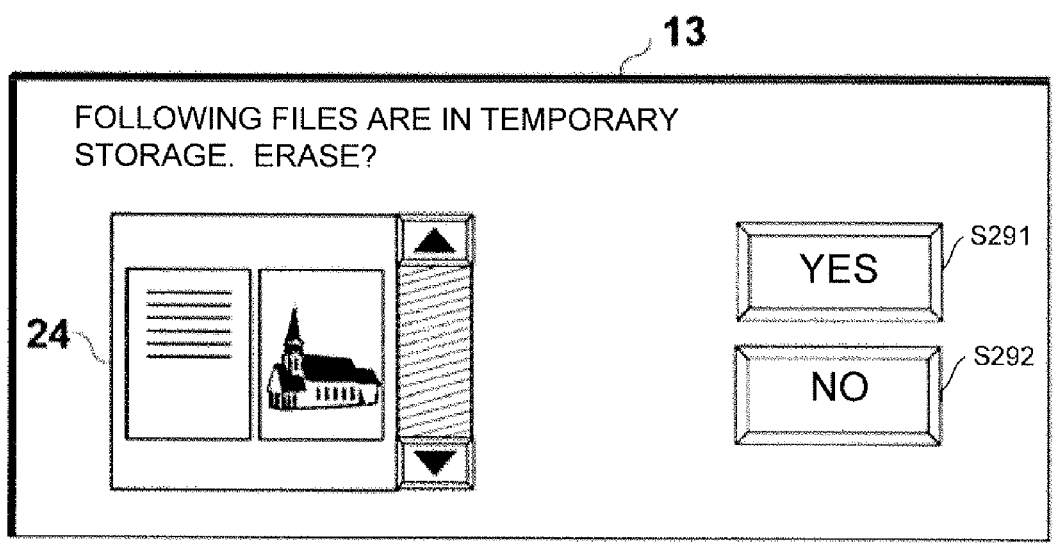
FIG. 22 is an image view showing display contents of an operation panel according to the second disclosed embodiment.

(S167) The CPU 31 forms a screen at a display panel in the operation panel unit 35 (Form Erase Request Screen) that asks whether or not image data that is stored in the data temporary storage unit 40 should be erased. FIG. 21 is an exemplary screen for asking about the file erasure. In this screen, there is a list 24 for displaying a file name of a file that is to be erased, a "YES" button 291 for indicating that the erasure should be performed, and a "NO" button 292 for indicating that the erasure should not be performed. In the display panel 13, a thumbnail that represents the contents of the file may be displayed as shown in FIG. 22.

(S168) When the CPU 31 determines that the user selects that the image data should be erased as a result of S167 (Erase, YES), the CPU 31 moves to S169. When the user selects that the image data should not be erased (Erase, NO), the CPU 31 ends the procedure. In other words, if the user selects the 'YES' button 291, the CPU 31 performs the procedure of S169; and if the user selects the "NO" button 292, the CPU 31 ends the procedure.

(S169) The CPU 31 instructs the data operation unit 41 to erase the image data stored in the data temporary storage unit 40. The data operation unit 41 erases the file that corresponds to the file name of the row obtained at S161 from among the image data stored in the date temporary storage unit 40. In the exemplary embodiment, the files with the file names, "PRINT_0001" and "SCAN_0001," are erased from the data temporary storage unit 40 (Erase Temporary Storage File).

(S170) The CPU 31 updates the contents of the identification information record unit 39 (Update ID Info. Record Unit). Specifically, the CPU 31 erases the row obtained at S161 and updates the information table. In the exemplary embodiment, the row Nos. 3 and 4 in FIG. 3 is erased. And then, the CPU 31 ends the procedure. Using such procedures, the data restoration to the external memory medium 36 can be completed in a shorter period of time. In the second disclosed embodiment, even if the user logs out while the external memory medium 36 is still attached and a different person than the initial user then logs on, the a next login user cannot use data in the external memory medium 36, and so the security is improved.

In the present application, this method is described with respect to an MFP. However, the present application should not be limited to the MFP, and can be applied to individual devices, such as a printer, a photocopy machine, or a scanner.

The image producing device, the image forming device, and the image processing device being thus described, it will be apparent that the same may be varied in many ways. Such variations are not to be regarded as a departure from the spirit and scope of the claimed invention, and all such modifications as would be apparent to one of ordinary skill in the art are intended to be included within the scope of the following claims.

What is claimed is:

1. An image forming device that writes and reads image data to and from an external memory medium, comprising:

a user interface configured to receive a selection of first image data in the external memory medium that stores at least the first data and second data, and an operating direction for executing an operation using the selected first image data;

a data operation unit configured to read out the selected first image data from the external memory medium;

a data storage unit configured to store the selected first image data read out by the data operation unit;

a control unit that causes the image forming device to execute the operation based on the selected first image data; and an identification information record unit configured to record first identification information that identifies an activity of the executed operation of the selected first image data in operation history information, wherein the data operation unit moves only the first image data from the external memory medium to the data storage unit, by referring to the record in the operation history information, and the second image data remains in the external storage medium after the first image data is moved from the external memory medium.

2. The image forming device according to claim 1, further comprising:

an external memory medium detection unit configured to detect whether the external memory medium is attached to the image forming device; and an interface unit configured to connect the external memory medium to the external memory medium detection unit, wherein when the external memory medium detection unit detects that the external memory medium is attached to the image forming device, the data operation unit moves the selected first image data that corresponds to the first identification information recorded in the identification information record unit from the external memory medium to the data storage unit.

3. The image forming device according to claim 2, wherein, when the external memory medium detection unit detects that the external memory medium is removed from the image forming device, the external memory medium detection unit erases the first identification information of the selected first image data recorded in the identification information record unit.

4. The image forming device according to claim 1, wherein when the selected first image data used in the executed operation is moved from the external memory medium to the data storage unit, the data operation unit updates storage location information of the first identification information of the selected first image data recorded in the identification information record unit.

5. The image forming device according to claim 1, wherein the data operation unit moves the selected first image data used in the executed operation and stored in the external memory medium to the data storage unit when a certain period of time has elapsed after a current login user ends using the image forming device.

6. The image forming device according to claim 5, further comprising:

a former user information memory unit configured to record first user identification information of the current login user, wherein when second user identification information of a subsequent login user, who logs in to use the image forming device after the current login user, is different from the first user identification information recorded in the former user information memory unit, the data operation unit moves the selected first image data used in the executed operation instructed by the current login user stored in the external memory medium to the data storage unit.

7. The image forming device according to claim 6, wherein when the data operation unit determines that the second user identification information of the subsequent login user is the same as the first user identification information of the current login user recorded in the former user information memory unit, and that the storage location information in the first identification information of the selected first image data used in the executed operation instructed by the current login user corresponds to the data storage unit, the data operation unit moves the selected first image data that corresponds to the first user identification information from the data storage unit to the external memory medium.

8. The image forming device according to claim 1, further comprising:

the control unit determines save start time to move the image data from the external memory medium to the data storage unit, wherein the data operation unit moves the image data to the data storage unit based on the save start time.

9. The image forming device according to claim 1, wherein the operation is printing of an image on a recording medium using the selected image data.

10. The image forming device according to claim 1, wherein the operation is one of moving the selected image data to the external memory medium, copying the selected image data stored in the external memory medium to another location, and renaming the selected image data stored in the external memory medium.

11. An image processing device that writes and reads image data to and from an external memory medium, comprising:

a user interface configured to accept logging in of a current login user based on current login user identification information entered by the current login user;

a former user information memory unit configured to record former login user identification information of a former login user who used the image processing device prior to the current login user;

a data operation unit configured to read out image data from the external memory medium;

a data storage unit configured to store the image data read out by the data operation unit; and a control unit configured to compare the current login user identification information of the current login user with the former login user identification information of the former login user upon acceptance of the logging in of the current login user, wherein, after the control unit compares the current login user identification information and the former login user identification information, the data operation unit moves the image data from the external memory medium to the data storage unit when the current login user identification information does not correspond to the former login user identification information, the data operation unit does not move the image data from the external memory medium to the data storage unit when the current login user identification information corresponds to the former login user identification information, the image processing device further comprises an identification information record unit configured to record first identification information of the image data stored in the external memory medium, and the data operation unit determines that the current login user identification information corresponds to the former login user identification information, and that storage location information of the image data in the first identification information corresponds to the data storage unit, the data operation unit moves the image data that corresponds to the first identification information from the data storage unit to the external memory medium.

12. The image processing device according to claim 11, further comprising:

an external memory medium detection unit configured to detect whether the external memory medium is attached to the image processing device; and an interface unit configured to connect the external memory medium to the external memory medium detection unit, wherein when the external memory medium detection unit detects that the external memory medium is attached to the image processing device, the image data that corresponds to the first identification information recorded in the identification information record unit is moved from the external memory medium to the data storage unit by the data operation unit.

13. The image processing device according to claim 12, wherein when the external memory medium detection unit detects that the external memory medium is removed from the image processing device, the external memory medium detection unit erases the first identification information recorded in the identification information record unit.

14. The image processing device according to claim 11, wherein, when the image data is moved from the external memory medium to the data storage unit, the data operation unit updates storage location information of the first identification information recorded in the identification information record unit.

15. The image processing device according to claim 11, wherein the data operation unit moves the image data stored in the external memory medium to the data storage unit when a certain period of time has elapsed after the current login user ends using the image processing device.

* * * * *